United States Patent [19]
Yoshida

[11] Patent Number: 5,881,327
[45] Date of Patent: Mar. 9, 1999

[54] CAMERA AND INPUT/OUTPUT DEVICE FOR CAMERA

[75] Inventor: Yutaka Yoshida, Saitama, Japan

[73] Assignee: Fuji Photo Film Co., Ltd., Kanagawa, Japan

[21] Appl. No.: 579,994

[22] Filed: Dec. 29, 1995

Related U.S. Application Data

[63] Continuation-in-part of Ser. No. 408,817, Mar. 23, 1995, abandoned.

[30] Foreign Application Priority Data

| Mar. 23, 1994 | [JP] | Japan | 6-52268 |
| Feb. 22, 1995 | [JP] | Japan | 7-033762 |

[51] Int. Cl.$^6$ .................................................. G03B 7/24
[52] U.S. Cl. .......................................... 396/207; 396/208
[58] Field of Search ............ 254/21, 412; 396/207, 396/208, 310, 311

[56] References Cited

U.S. PATENT DOCUMENTS

| 4,443,077 | 4/1984 | Tanikawa | 354/21 |
| 4,912,492 | 3/1990 | Ishikawa et al. | 354/266 |
| 4,945,365 | 7/1990 | Fujino | 354/21 |
| 5,032,854 | 7/1991 | Smart et al. | 354/21 |
| 5,181,062 | 1/1993 | Kazumi | 354/412 |
| 5,198,851 | 3/1993 | Ogawa | 354/512 |
| 5,440,363 | 8/1995 | Minnick et al. | 354/21 |
| 5,446,518 | 8/1995 | Kazumi | 354/412 |
| 5,583,567 | 12/1996 | Nagasawa et al. | 348/207 |

FOREIGN PATENT DOCUMENTS

| 230931 | 2/1990 | Japan | G03B 17/00 |
| 256532 | 2/1990 | Japan | G03B 17/18 |

*Primary Examiner*—Safet Metjahic
*Assistant Examiner*—Christopher E. Mahoney
*Attorney, Agent, or Firm*—Sughrue, Mion, Zinn, Macpeak & Seas, PLLC

[57] ABSTRACT

An external input/output device has a plug-in unit having the same shape as a photographic film cassette. The plug-in unit is insertable in a cassette chamber of a camera having a reflective photo-sensor for reading bar codes from a bar code disc of the photographic film cassette. The plug-in unit has a reflective photo-sensor whose light projecting element and photoelectric element are opposed to a photoelectric element and a light projecting element of the photo-sensor of the camera when the plug-in unit is inserted in the cassette chamber. After setting the camera in a data I/O mode, a keyboard of the input/output device is operated to enter control value data to be written in an EEPROM of the camera, or commands for monitoring control value data stored in the EEPROM. The data or command is inputted as light pulses in the camera through the light projecting element of the input/output device and the photoelectric element of the camera. The control value data from the EEPROM is outputted as light pulses to the input/output device through the light projecting element of the camera and the photoelectric element of the input/output device.

23 Claims, 25 Drawing Sheets

CAMERA AND INPUT/OUTPUT DEVICE FOR CAMERA

RELATED APPLICATION

This is a Continuation-In-Part of application Ser. No. 08/408,817 filed Mar. 23, 1995, abandoned.

BACKGROUND OF THE INVENTION

1. Field of the Invention

The present invention relates to a camera with a data communication system and an input/output device for use with the camera.

2. Background Art

Recent cameras have more and more electronic data processing systems. For example, a memory stores data for correction of light value projected from a light-measuring system or a flash unit, data for checking the battery or other data, while a microcomputer executes various sequence programs with reference to the data stored in the memory. Lately, a camera using a rewritable non-volatile memory such as an EEPROM (electrically erasable programmable ROM) in place of ROM (a not-rewritable memory), has been disclosed, e.g., in JPA 2-56532 or JPU 2-30931. This camera permits adjusting and checking its electric data processing system after being completely assembled.

To write or read the EEPROM, the known camera must be connected to an external input/output device through a specific electric terminal which should be difficult for ordinary users to access, but should be easily connectable to the input/output device when it is necessary. Therefore, the electric terminal of the known camera is disposed inside the camera and can be exposed to the outside through a complicated mechanism.

OBJECT OF THE INVENTION

In view of the foregoing, a primary object of the present invention is to provide a camera and an external input/output device for the camera which are easy to connect to each other, and facilitate data communication therebetween.

SUMMARY OF THE INVENTION

To achieve the above and other objects in a camera which has a reflective photo-sensor as a bar code sensor, the present invention suggests inputting control value data to be written in a memory, e.g., EEPROM of the camera through a photoelectric element of the photo-sensor. That is, the camera of the present invention is provided with a data input mode wherein optical signals, e.g. light pulses, inputted through the photoelectric element may be written as the control value data in the memory. The optical signal may be sent from a light projecting member of an external input device. The light projecting member is insertable in a cassette chamber of the camera so as to be opposed to the photoelectric element of the photo-sensor. The input device further has an operating section for entering control value data to be written in the memory of the camera, and a control section for driving the light projecting member to output an optical signal in correspondence with the data entered through the operating section.

Accordingly, it is unnecessary to provide a specific data input/output terminal in the camera, nor a complicated mechanism for closing and exposing such a data input/output terminal.

When monitoring control value data stored in the memory of the camera, a control device of the camera drives a light projecting element of the photo-sensor to output optical signals in correspondence with the control value data. The optical signal from the camera is detected through a photoelectric member of the external input/output device, which then displays the control value data on a display screen. In this way, the control value data stored in the memory can be monitored with ease, so that it is possible to check the function of the camera or correct the control value data.

BRIEF DESCRIPTION OF THE DRAWINGS

Other objects and advantages of the present invention will become apparent in the following detailed description of the preferred embodiments when read in connection with the accompanying drawings, wherein like reference numerals designates like or corresponding parts throughout the several views, and wherein.

DESCRIPTION OF THE PREFERRED EMBODIMENTS

Figure 1:
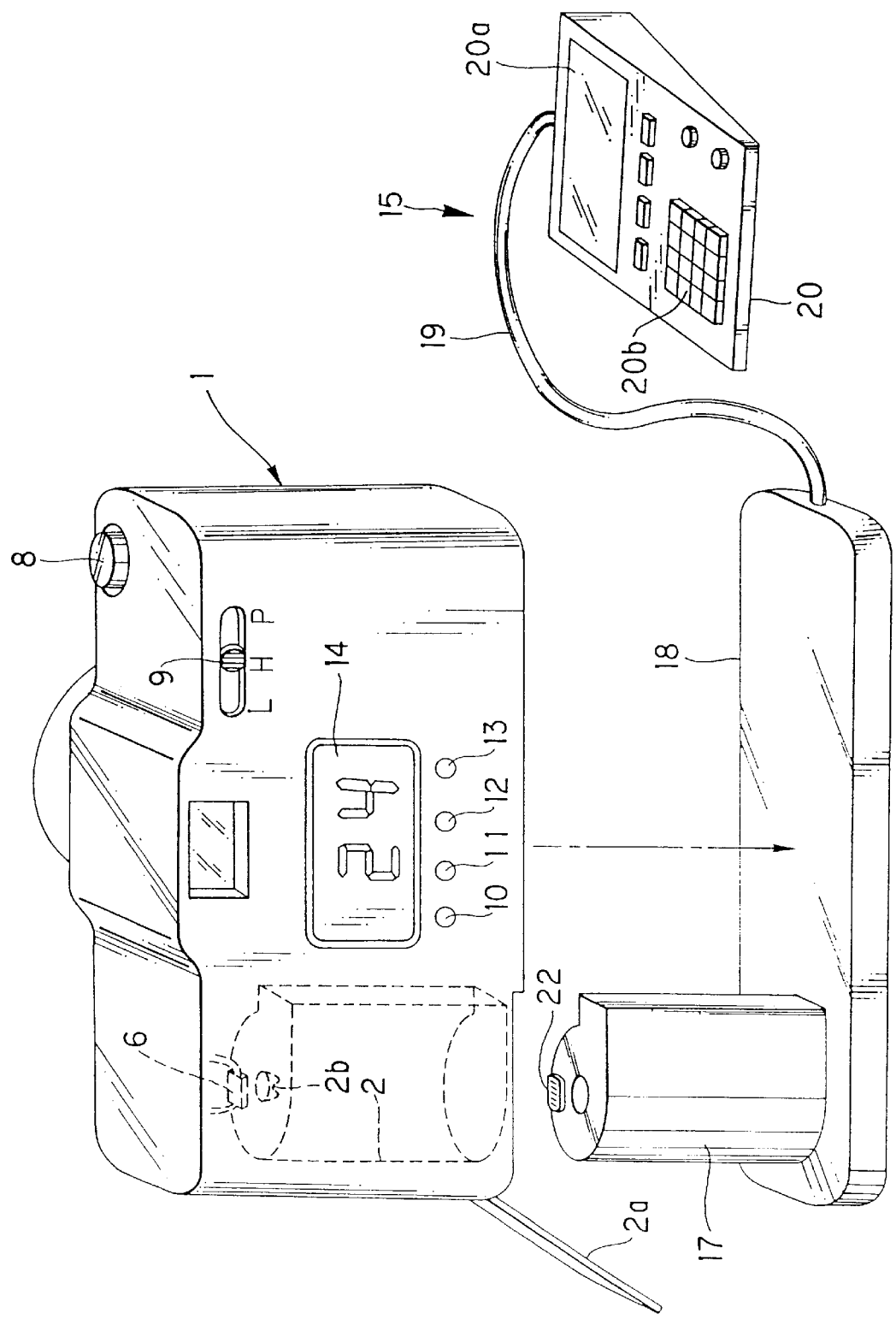
FIG. 1 illustrates perspective views of a camera and an external input/output device for the camera according to a preferred embodiment for the invention.
Figure 2:
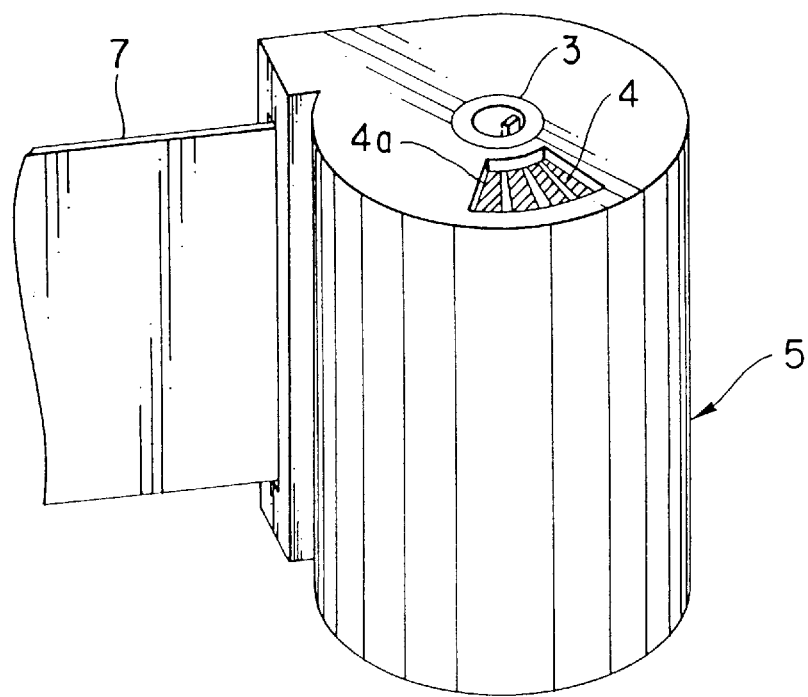
FIG. 2 is a perspective view of a photographic film cassette for use with the camera shown in FIG. 1, having a bar code disc rotatable with a spool of the cassette.

Referring to FIGS. 1 and 2, a camera 1 has a cassette chamber 2 for loading a photographic film cassette 5 therein. In this embodiment, the cassette 5 is loaded from the bottom of the chamber 2 by opening a lid 2a. The photographic film cassette 5 has a bar code disc 4 rotatable with a spool 3 thereof, while a reflective photo-sensor 6 is mounted inside the cassette chamber 2 so as to read bar codes from the bar code disc 4 through a bar code window 4a formed through a top wall of the photographic film cassette 5. The bar codes represent various information about photographic film 7 of the cassette 5, such as ISO-speed, available number of exposures latitude and so forth. The reflective photo-sensor 6 may be a conventional photo-sensor constituted of a light emitting diode (LED) 6a and a photoelectric element such as a photo-transistor 6b. The photo-sensor 6 is also used for revising an EEPROM mounted in the camera 1, as will be described below.

A shutter button 8 is disposed on a top side of the camera 1. On a back side of the camera 1, there are a frame size switch 9 for changing the picture frame size between a full size "L" of 35 mm film (aspect ratio 1.46), and a high-vision size "H" (aspect ratio 1.78), and a panoramic size "P" (aspect ratio 2.86), a photo-mode switch 10 for selecting a photographic mode such as a day-light synchronized flash mode, a self-timer switch 11, a date set switch 12, a date mode switch 13 and a liquid crystal display panel 14 for displaying the date, battery condition, the number of exposed frames, or other data.

An external input/output device 15 for the camera 1 is shown below the camera 1. The input/output device 15 has a plug-in unit 17 which is directed to be inserted in the cassette chamber 2 of the camera 1 and has the same shape as the cassette 5. The plug-in unit 17 is mounted on a base 18 which is connected to a main body 20 of the input/output device 15 through a cord 19. The main body 20 is provided with a monitor screen 20a and a keyboard 20b. The plug-in unit 17 has a reflective photo-sensor 22 mounted on a top side thereof. The photo-sensor 22 may have the same construction as the photo-sensor 6, and is arranged such that an LED 22a and a photo-transistor 22b of the photo-sensor 22 are respectively opposed to the photo-transistor 6b and the LED 6a of the photo-sensor 6 when the plug-in unit 17 is inserted in the cassette chamber 2.

Figure 3:
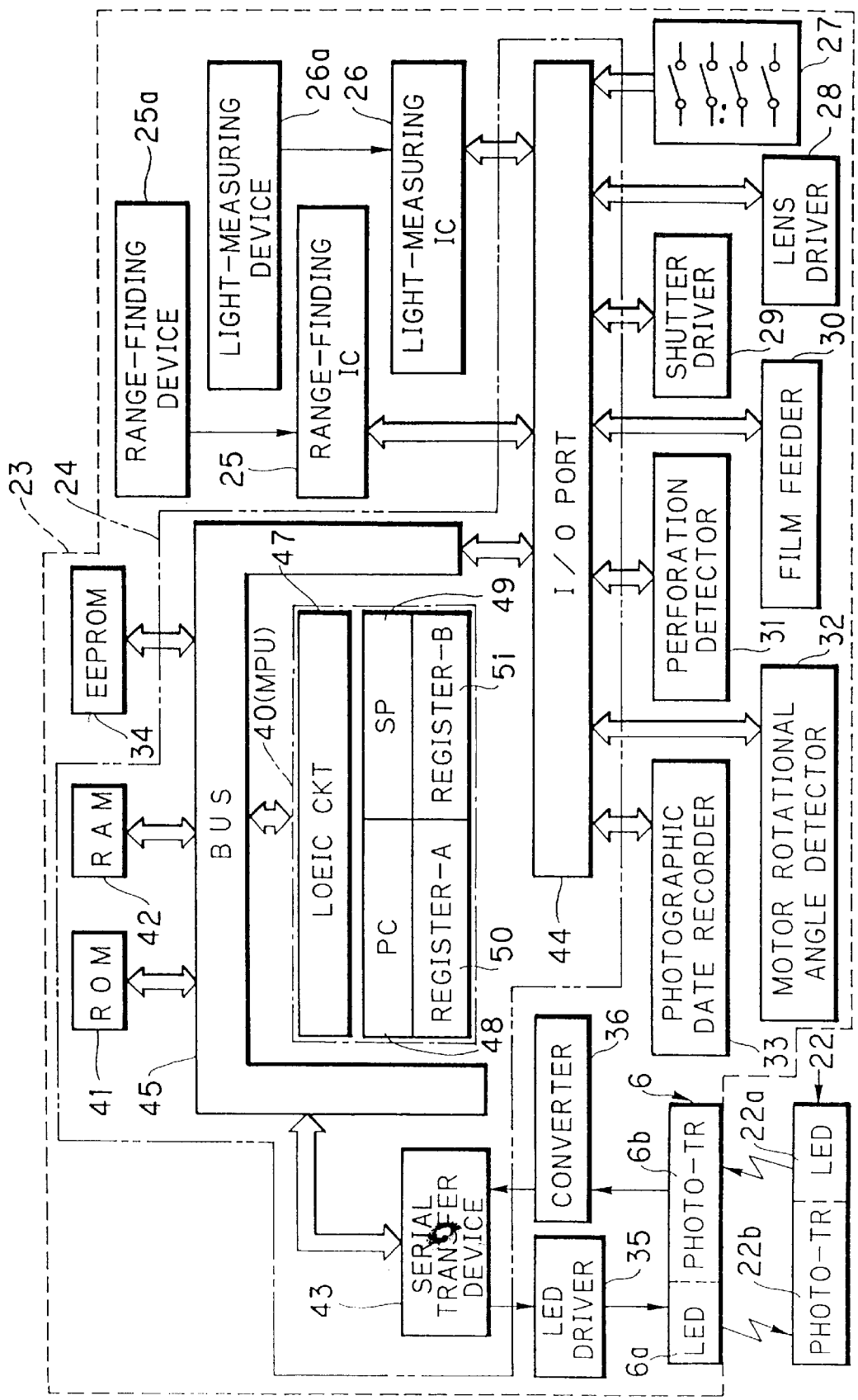
FIG. 3 is a block diagram of the camera shown in FIG. 1.
Figure 4:
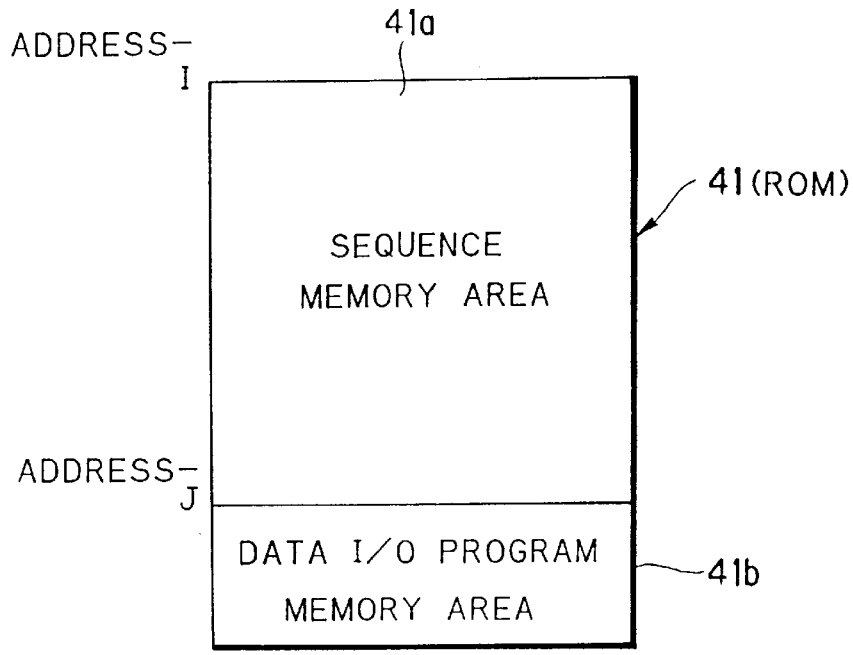
FIG. 4 is an explanatory view of a ROM mounted in the camera.
Figure 7:
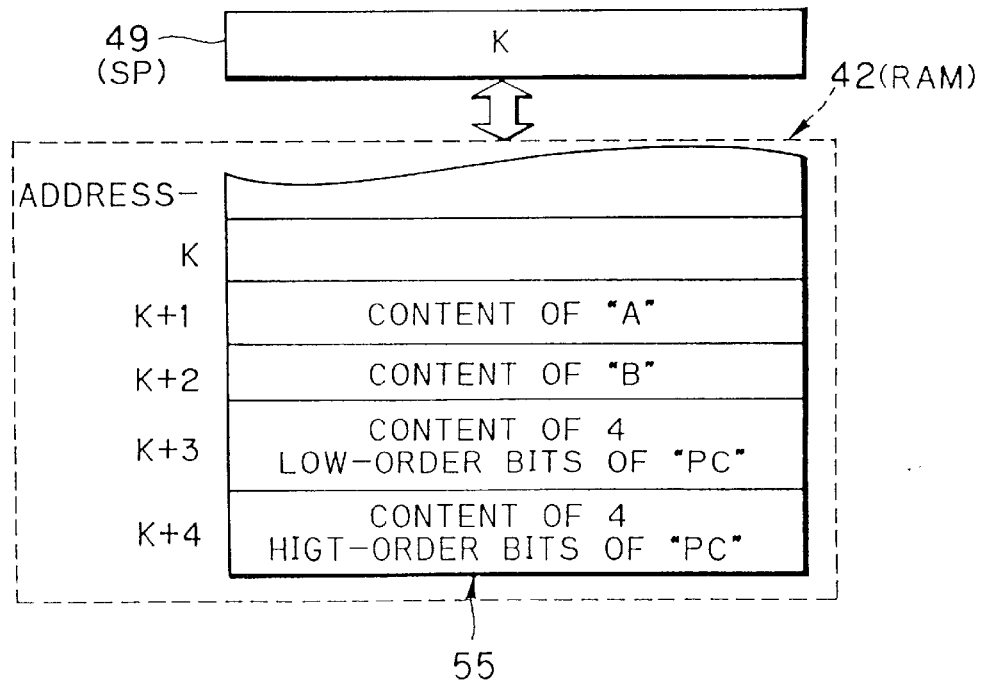
FIG. 7 is an explanatory view of a stack area included in a RAM mounted in the camera.

The camera 1 has an electronic circuit 23 as shown in FIG. 3, which includes a single-chip microcomputer 24, a range-finding IC 25, a light-measuring IC 26, various switches 27, a lens positioning device 28, a shutter driver 29, a film feeder 30, a perforation detector 31, a motor rotational angle detector 32, a photographic date recorder 33, the EEPROM 34, an LED driver 35, a converter 36 including a current-to-voltage conversion circuit and a comparator therein, and the photo-sensor 6.

The microcomputer 24 includes a microprocessor unit (MPU) 40, a ROM 41, a RAM 42, a serial transfer device 43, an I/O port 44 and a bus 45 for transporting data and address commands between these elements, which are integrated into a chip. The MPU 40 includes a logic circuit 47 for calculation and control, a program counter 48, a stack pointer 49, a register-A 50, a register-B 51 and other registers as well as a clock generator, which are constructed in a conventional manner.

The ROM 41 includes a sequence memory area 41a for storing the sequence of programs to be sequentially executed for photography and a data I/O program memory area 41b. The address of the sequence memory area 41a starts with "I", while the address of the data I/O program memory area 41b starts with "J". The ROM 41 may be replaced by an EEPROM so as to permit debugging the sequential programs. The RAM 42 is used as a work area for temporarily storing various data and address commands during the execution of the sequential programs. Also, the RAM 42 is used as a stack area for temporary back-storing data of the registers of the microcomputer 24. The range-finding IC 25 and the light-measuring IC 26 control a range finding device 25a and a light-measuring device 26a, respectively, in accordance with commands from the MPU 40, and control the lens positioning device 28 and the shutter driver 29 in accordance with obtained distance data and brightness data through the I/O port 44.

The I/O port 44 intermediates data communication between the MPU 40 and peripheral devices such as the range-finding IC 25, the light-measuring IC 26, the switches 27, the lens driver 28, the shutter driver 29, the film feeder 30, the perforation detector 31, the motor rotational angle detector 32 and the photographic data recorder 33, in response to address commands from the MPU 40.

Figure 5:
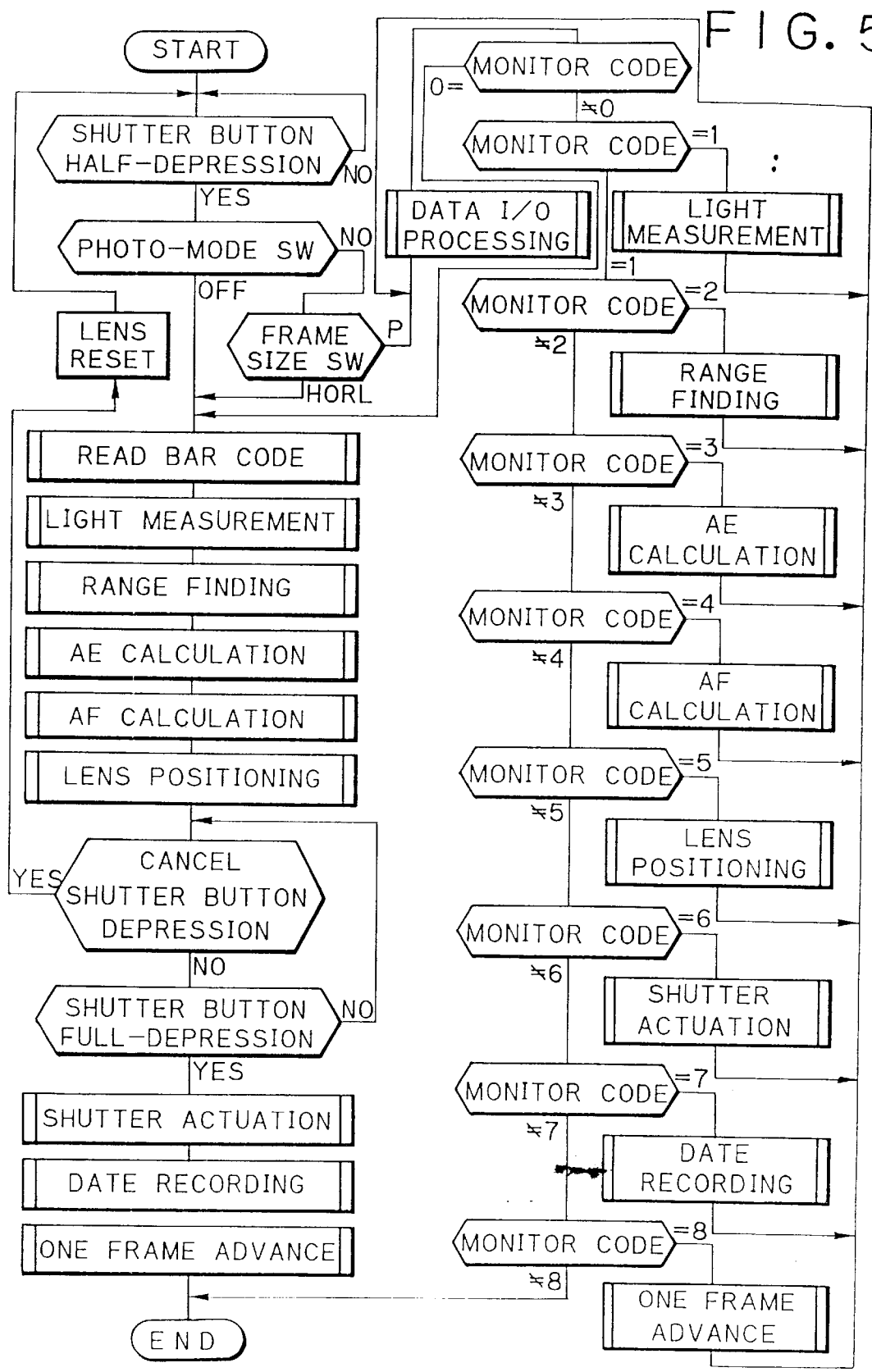
FIG. 5 is a flow chart illustrating the sequence of programs executed by a microcomputer of the camera.

The camera 1 performs photographic processes according to the sequence as shown in FIG. 5 which is stored in the sequence memory area 41a of the ROM 41. When the shutter button 8 is depressed halfway after the cassette 5 is inserted in the cassette chamber 2, an associated one of the switches 27 is turned on to input a corresponding signal to the MPU 40. The MPU 40 checks if the photo-mode switch is turned ON, and if the frame size switch 9 is set in the panoramic size "P". The photo-mode switch 10 is ordinarily turned OFF.

When the photo-mode switch 10 is OFF, the photographic sequence stored in the ROM 11 is executed. At that time, the microcomputer 24 controls the LED 6a to turn ON and OFF through the serial transfer device 43 to project light toward the bar code disc 4, and detects light reflected from the bar code disc 4 through the photo-transistor 6b. While the photo-sensor 6 thus reads the bar codes, the spool 3 and the bar code disc 4 are rotated through a spool drive shaft 2b, to advance a leading end of the photographic film 7 to the outside of the cassette 5 till the leading end is wound around a take-up spool of the camera 1. The photoelectric current detected through the photo-transistor 6b is converted into a voltage signal, and then into binary code data by being compared with the reference voltage of the comparator in the converter 36. In this way, photographic data is represented by the bar codes, e.g. the film speed, latitude, available number of exposures and other data about the photographic film 7, are read and stored in the RAM 42 in accordance with the address commands from the MPU 40. Then, the MPU 40 sequentially outputs sampling commands for brightness data and distance data to the light-measuring IC 26 and the range-finding IC 25. the brightness data and the distance data are stored in designated locations of the RAM 42, and then the MPU 40 performs AE (automatic exposure) and the AF (auto-focus) calculations based on the brightness data and the distance data.

In the AE calculation, an optimum exposure amount is determined depending on the film speed and other data as well as the brightness data, and an exposure time or a shutter opening period of a program shutter is calculated in correspondence with the optimum exposure amount. The exposure time data thus calculated is stored in another location of the RAM 42. In the AF calculation, a subject distance is determined based on the distance data sent from the range-finding IC 25 and an optimum focusing position of a taking lens of the camera 1 is calculated in correspondence with the subject distance. The optimum focusing position is also stored in a designated location of the RAM 42.

After completion of the AE and AF calculations, the MPU 40 activates the lens driver 28 to put the taking lens in the optimum focusing position while referring to the RAM 42. In response to an end signal indicating that the lens positioning is complete, the MPU 40 enables the shutter button 8 to be fully depressed.

When the shutter button 8 is fully depressed, the MPU 40 activates the shutter driver 29 with reference to the RAM 42, to open the program shutter for the calculated exposure time. In response to an end signal indicating that the exposure is complete, the MPU 40 activates the photographic date recorder 33 to record the date and time of photographing on the photographed image by double-exposure. For example, the above end signals are fed back to the MPU 40 when predetermined ones of the switches 27 are turned ON.

Thereafter, the MPU 40 activates the film feeder 30 to feed or advance the photographic film 7. Then, a photoelectric element of the perforation detector 31 outputs a pulse each time a perforation passes by. The pulses from the perforation detector 31 is counted by the MPU 40 so as to inactivate the film feeder 30 upon the eighth pulse. In this way, the photographic film 7 has been advanced by one frame, terminating one cycle of the photographic sequence. Concurrently with the above operation, necessary control values are read from the EEPROM 34.

In the above photographic sequence, individual processes such as light-measurement, range finding, AE calculation, and so forth are each performed in a subroutine. A data I/O program, which is stored in the data I/O program memory area 41b of the ROM 41, permits each subroutine to be conducted independently from other subroutines. The data I/O program is executed when the camera 1 is set in a data I/O mode in response to an address command "J" that is, when the data I/O program memory 41b of the ROM 41 is called. The data I/O mode should be started under a switching condition that would not be likely to be set during the ordinary photographic operation, in order to prevent unexpected execution of the data I/O program. For example, the camera 1 is set in the data I/O mode only when the shutter button 8 is depressed halfway while the photo-mode switch 10 is turned ON and the frame size switch 9 is set in the panoramic size "P".

Figure 6:
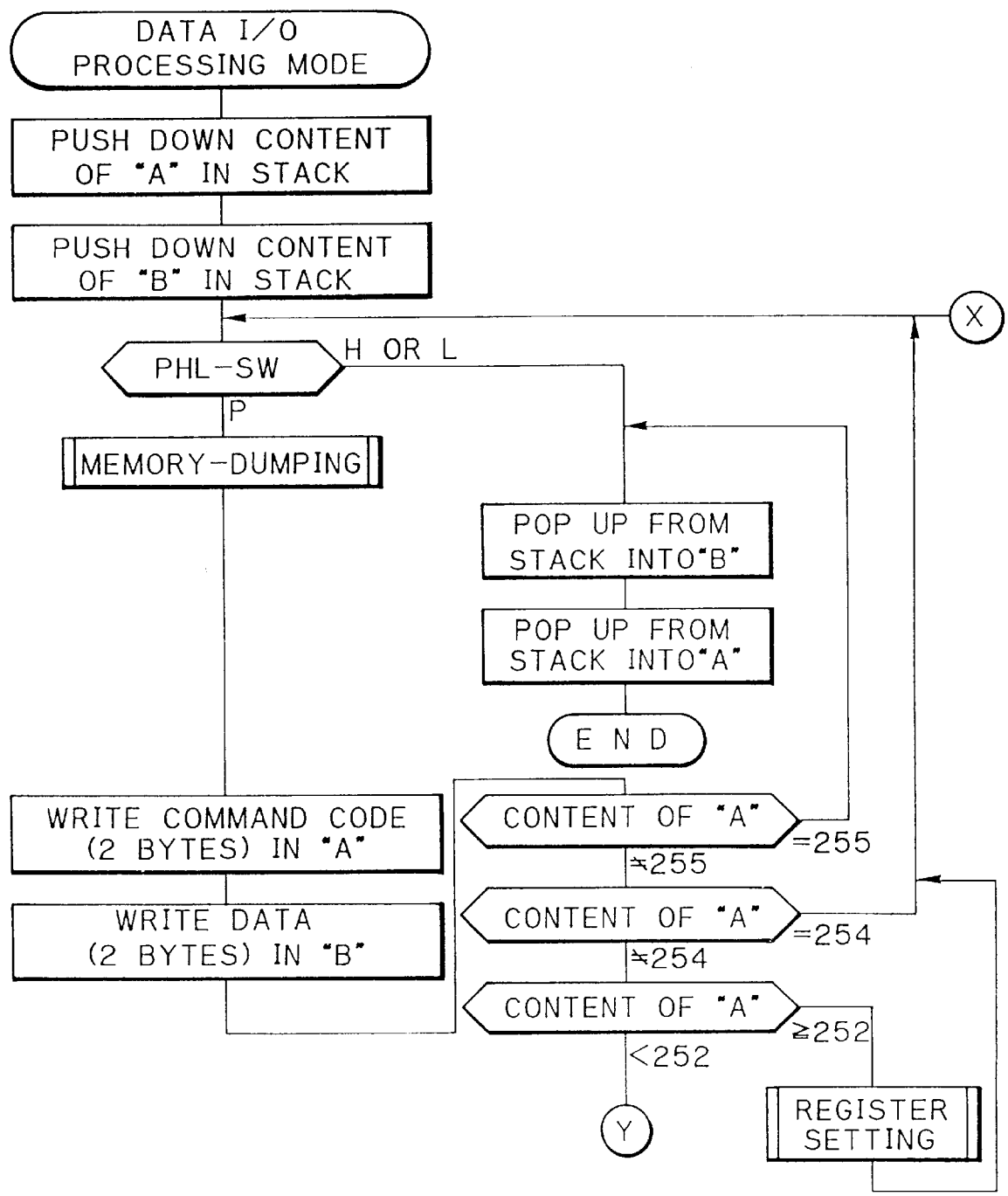
FIG. 6 is a flow chart illustrating the sequence of a data input/output program.

When effecting one of the subroutines independently of other processes, the input/output device 15 is connected to the camera 1 by inserting the plug-in unit 17 in the cassette chamber 2 until the bottom of the camera 1 comes into tight contact with the base 18. Monitor codes "1" to "8" in decimal notation are set in a predetermined location of the RAM 42 through the keyboard 20b of the input/output device 15 prior to starting a monitor program included in the data I/O program, so as to select one of the subroutines to be monitored. Simultaneously, necessary parameters for the independent execution of the selected one subroutine (e.g., for the subroutine of shutter actuation, a shutter speed and an aperture-stop size) are set in the associated location of the RAM 42. To start the monitor program, the MPU 40 first executes a data I/O processing as shown in FIG. 6. Also, the MPU 40 executes the data I/O processing after each monitor process of a selected subroutine. In this way, it is possible to monitor the subroutines one after another by entering a corresponding one of the monitor codes "1" to "8". In the flow charts in the drawings, the program counter 48, the stack pointer 49, the register-A 50 and the register-B 51 are represented simply by "PC", "SP", "A" and "B".

In the data I/O processing shown in FIG. 6, the contents of the register-A 50 and the register-B 51 are sequentially pushed down into a stack area 55 of the RAM 42. When the stack pointer 49 is set with an address command "K", the contact of the register-B 51 is stored in a stack location of address "K+1" of the stack area 55, and the content of the register-A 50 is stored in a stack location of address "K+2" of the stack area 55. On the other hand, stack locations of address "K+3" and address "K+4" store the contents of four low-order bits and four high-order bits of the program counter 48, respectively.

After this stacking, it is checked if the frame size switch 9 is still set in the position "P". If the frame size switch 9 is displaced from the position "P", the data in the locations of addresses "K+1" and "K+2" of the stack area 55 is popped up to be stored back into the registers-A and B. Thus, the data I/O program is terminated. Simultaneously, the program addresses stored in the locations of address "K+3" and "K+4" of the stack area 55 are set back in the program counter 48. Thus, the sequence returns to the main routine with an initial condition that was set when the data I/O program was called.

When the frame size switch 9 is still set in the position "P", memory dumping is first executed. The memory dumping is to output content of a work area of the RAM 42, the data of the I/O port 44 that has been transferred from the range-finding IC 25, the light-measuring IC 26 and so forth, the content of the EEPROM 35, and data of the respective registers of the MPU 40 to the input/output device 15 through the serial transfer device 43. The work area of the RAM 42 is memory locations utilized for writing and reading data on execution of the photographic sequence.

The serial transfer device 43 outputs data in a predetermined manner. For example, the data is outputted two bytes (=one block) at a time in an order as shown in the following Table 1, provided that the addresses of the work area of the RAM 42 is from "0" to "127" in decimal notation.

TABLE 1

| ORDER | CONTENT |
| --- | --- |
| 1st Block | Address 0–1 of RAM |
| 2nd Block | Address 2–3 of RAM |

TABLE 1-continued

| ORDER | CONTENT |
|---|---|
| 3rd Block | Address 4–5 of RAM |
| . | . |
| . | . |
| . | . |
| 64th Block | Address 126–127 of RAM |
| 65th Block | Address 0–1 of EEPROM |
| 66th Block | Address 2–3 of EEPROMN |
| 67th Block | Address 4–5 of EEPROM |
| . | . |
| . | . |
| . | . |
| 96th Block | Address 62–63 of EEPROM |
| 97th Block | Address 0–1 of I/O port |
| 98th Block | Address 2–3 of I/O port |
| 99th Block | Address 4–5 of I/O port |
| . | . |
| . | . |
| . | . |
| 104th Block | Address 14–15 of I/O port |
| 105th Block | Register-A & B |
| 106th Block | Program counter |

Figure 8:
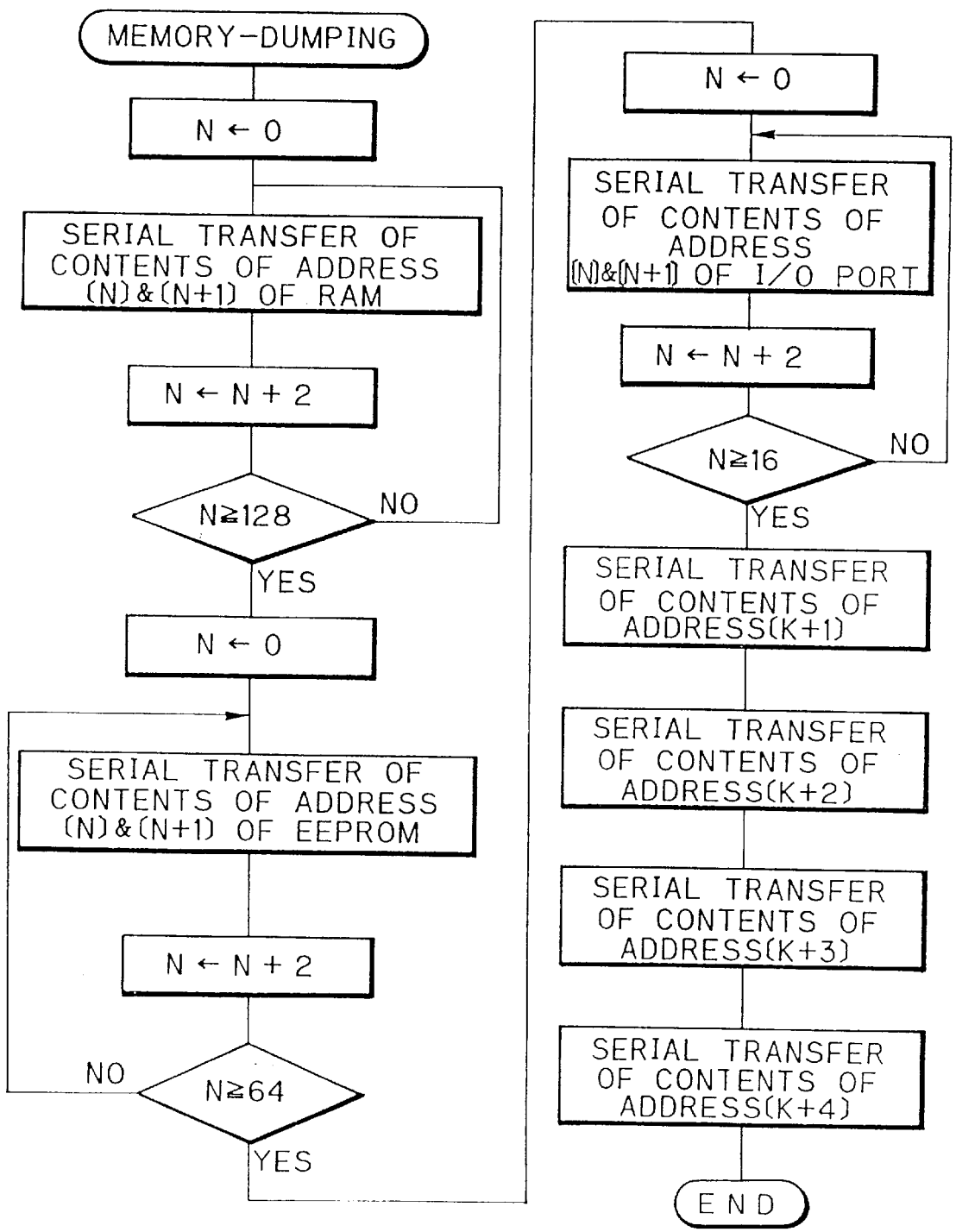
FIG. 8 is a flow chart illustrating the sequence of a memory dumping process included in the data input/output program.

The data outputted from the serial transfer device 43 causes the LED 6a of the reflective photo-sensor 6 to emit light intermittently through the LED driver 35. The light from the LED 6a is received on the photoelectric element 22b of the reflective photo-sensor 22 of the input/output device 15. The current from the photoelectric element 22b is converted into a voltage signal and is transferred through a serial transfer device into a memory of the input/output device 15, wherein the serial transfer device may have the same contour as the serial transfer device 43, but functions as a decoder in this case. Thereafter, the data is displayed on the monitor screen 20a. Accordingly, it is possible to monitor the data processing that is determined to be carried out in the subroutine selected by the monitor code as described above with reference to FIG. 5. The flow chart of the memory dumping is illustrated in FIG. 8.

When the memory dumping is complete, the MPU 40 is enabled to accept serial data through the serial transfer device 43. Then, a command code, which may be entered through the keyboard 20b, is transferred to the register-A 50 upon actuation of an execution key of the keyboard 20b. Thereafter, data to be revised is entered through the keyboard 20b, and is transferred to the register-B upon actuation of the execution key. The data stored in the register-B 51 is processed in accordance with the command code having been stored in the registers-A 50, in a manner as shown in Table 2. The data transfer from the input/output device 15 to the registers A 50 and B 51 is carried out through the serial transfer device of the input/output device 15, the LED 22a, the photo-sensor 6, the converter 36 and the serial transfer device 43 in a similar manner but in a reverse order to the data transfer from the camera 1 to the data input/output device 15.

TABLE 2

| CONTENT OF "A" | DATA PROCESSING |
|---|---|
| 0 | Write the content of "B" in address "0" of RAM |
| 1 | Write the content of "B" in address "1" of RAM |
| 2 | Write the content of "B" in address "2" of RAM |
| . | . |
| . | . |

TABLE 2-continued

| CONTENT OF "A" | DATA PROCESSING |
|---|---|
| . | . |
| . | . |
| 127 | Write the content of "B" in address "127" of RAM |
| 128 | Write the content of "B" in address "0" of EEPROM |
| 129 | Write the content of "B" in address "1" of EEPROM |
| 130 | Write the content of "B" in address "2" of EEPROM |
| . | . |
| . | . |
| . | . |
| 191 | Write the content of "B" in address "63" of EEPROM |
| 192 | Write the content of "B" in address "0" of I/O port |
| 193 | Write the content of "B" in address "1" of I/O port |
| 194 | Write the content of "B" in address "2" of I/O port |
| . | . |
| . | . |
| . | . |
| 207 | Write the content of "B" in address "15" of I/O port |
| 252 | Write the content of "B" in address "K + 1" of RAM |
| 253 | Write the content of "B" in address "K + 2" of RAM |
| 254 | Memory dumping only |
| 255 | End of data I/O processing |

Figure 9:
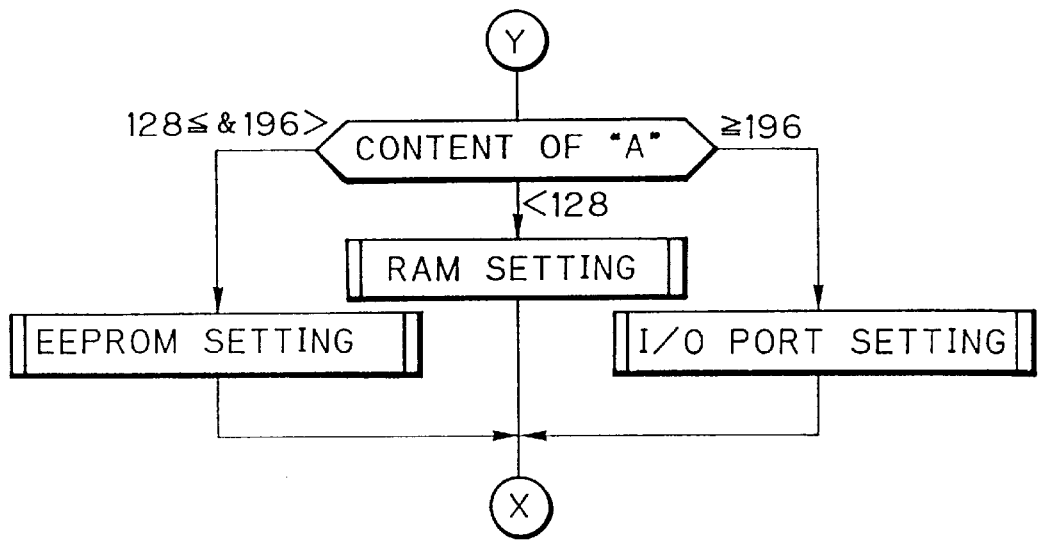
FIG. 9 is a flow chart continuing from the flow chart of FIG. 6.
Figure 10:
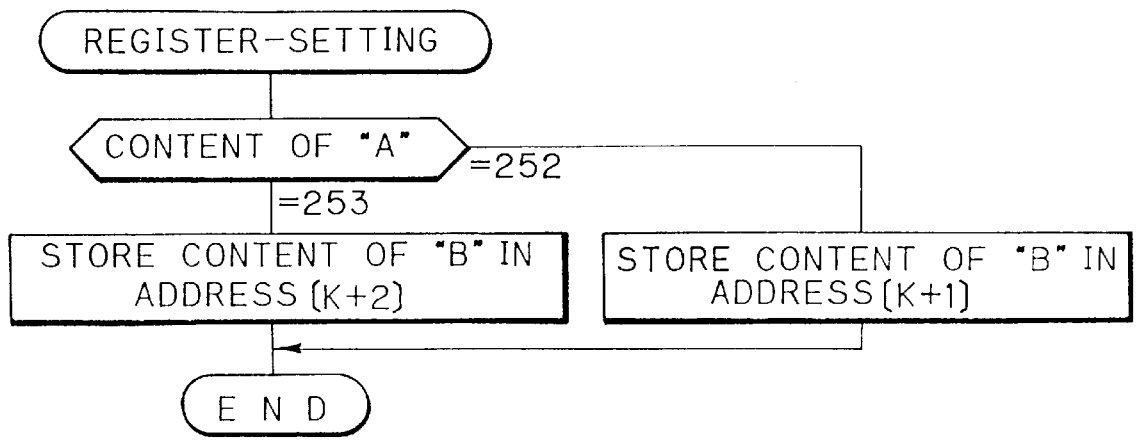
FIG. 10 is a flow chart illustrating the sequence of a register setting process included in the data input/output program.

As shown in FIG. 6, when the command set in register-A 50 through the serial transfer device 43 is less than "252", the data set in the register-B 51 is written in the RAM 42 or the EEPROM 43 or the I/O port 44, as is shown in FIG. 9. That is, the data is overwritten in a location addressed with the command set in the register-A 50 in a manner as shown in Table 2. When the command set in the register-A 50 is "252" or "253", the data set in the register-B 51 is written in address "K+1" or "K+2" of the stack area 55, respectively, as shown in FIG. 10.

After the memory dumping, the rewriting or revising of the data may be repeated until a command "255" is set in the register-A 50. When the command "255" is set, the data I/O processing is terminated to return to the main routine of the photographic sequence.

In this way, the condition of the MPU 40, that is, the data in either of the RAM 42, the I/O port 44, the EEPROM 43 and the stack area 55 may be revised through the serial transfer device 43 in the data I/O program. By entering an optional monitor code, it is possible to check, adjust or inspect the performance of each individual control unit, such as the range-finding IC 25, the light-measuring IC 26, the switches 27, the lens driver 28 and so on with appropriate parameters. It is also possible to write control value data, e.g., light level correction data for the light-measuring device 26a in the EEPROM 43 depending on the conditions of each individual camera 1. The control value data stored in the EEPROM 43 may be monitored and/or revised in the data I/O program.

As described so far, the photoelectric element 6b of the reflective photo-sensor 6 receives two types of signals: one is the bar code data signal from the bar code disc 4, and the other is various data from the I/O device 15. Since the bar code data signal is light projected from the light emitting element 6a of the photosensor 6 itself and then reflected from the bar code disc 4, its intensity is relatively low. So the photoelectric current detected by the photosensor 6 can be too weak to obtain correct binary bar code data. Therefore, it is necessary for the bar code data signal to be amplified to a larger degree. For the data signal from the I/O device 15, as light is projected directly toward the photosensor 6 from the light emitting element 22a of the I/O device 15, a relatively small amplification factor is enough.

On the other hand, because the bar code disc 4 is rotated by the drive shaft 2b of the camera at a relatively low speed, and the density of the bar codes are not so large, ON-OFF frequency of the photoelectric current is relatively low. For the bar code data signal, the response speed of a converter for converting the photoelectric current into binary data may be relatively low. On the contrary, the converter in general is required to have a high response speed of several hundred baud to several thousand baud for reading the data signal from the I/O device 15. Accordingly, it is desirable to increase the amplification factor of the converter on receiving the bar code data signal, or increase the response speed of the converter on receiving the data signal from the I/O device 15.

FIGS. 22 to 27 show preferred embodiments for changing the amplification factor of the response speed according to the type of the received signal.

Figure 22:
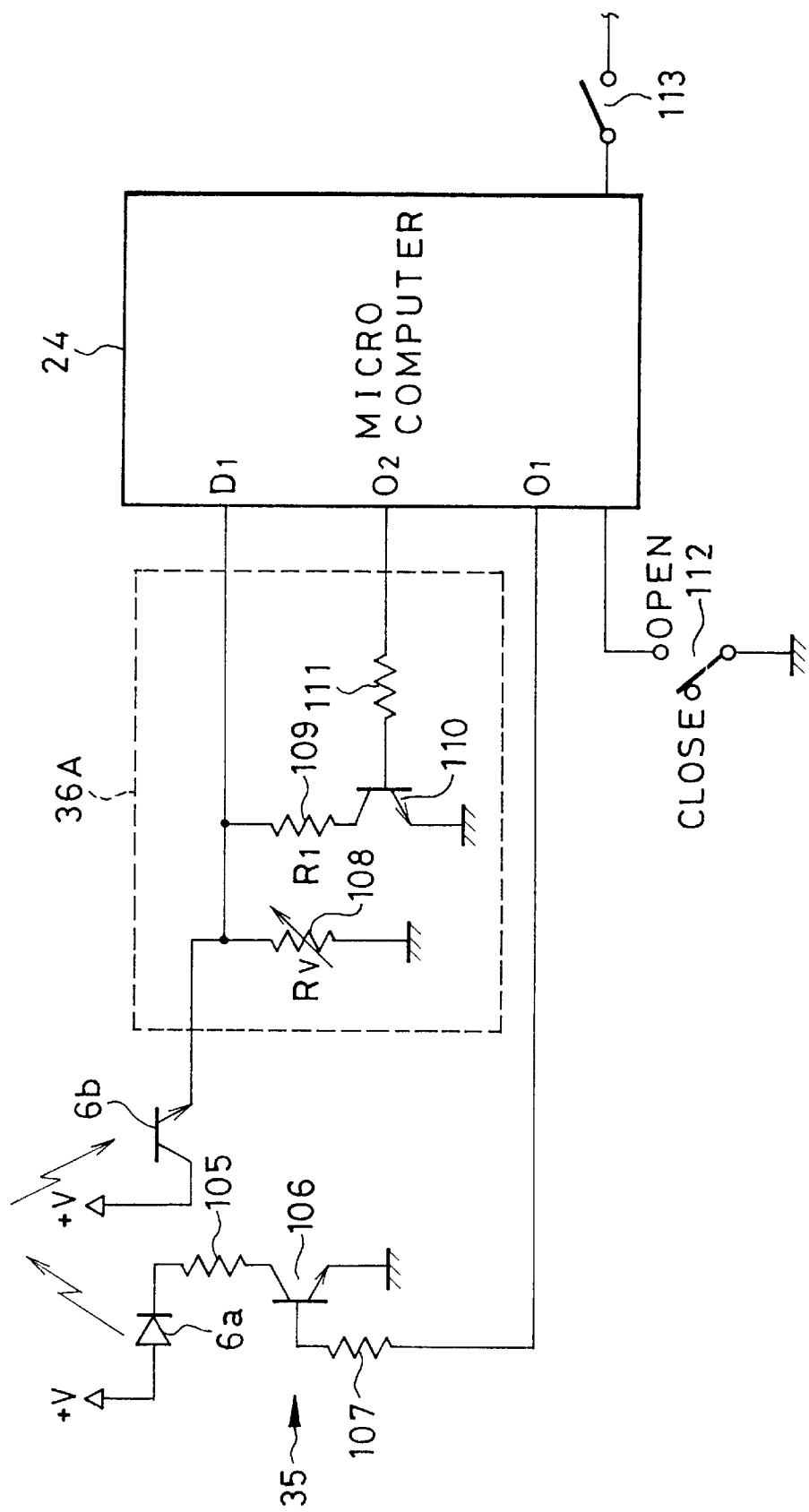
FIG. 22 is a circuit diagram of a converter for converting photoelectric signals received on the photo-sensor into binary data, according to an embodiment of the present invention.

In FIG. 22, the converter 36A is constituted of a variable resistance 108, a fixed resistance 109, an NPN transistor 110 and a base resistance 111. The emitter of the photo-transistor 6b is connected to the variable resistance 108. The connection line between the photo-transistor 6b and the variable resistance 108 is tapped to a data input terminal D1 of the microcomputer 24. The variable resistance 108 is connected in parallel with the fixed resistance 109, which is connected in series to the collector of the transistor 110. The base of the transistor 110 is connected through the resistance 111 to an output terminal O2 of the microcomputer 24. The LED 6a is connected to another output terminal O1 of the microcomputer 24 through an LED driver 35 which is constituted of a resistance 105, an NPN transistor 106 and a base resistance 107. Thus, the LED 6a is driven in response to the signal from the O1-terminal of the microcomputer 24. A switch 113 for switching over the camera between the photographic sequence mode and the data I/O mode is connected to the microcomputer 24. Other basic construction may be equal to the first described embodiment.

When the switch 113 is turned ON to set the camera in the data I/O mode, the microcomputer 24 prepares for processing the data signal from the I/O device 15 and, at the same time, sets the O2-terminal to a high (H) voltage level, whereupon the NPN transistor 110 is turned ON. As a result, each time a photoelectric current I1 is detected by the photo-transistor 6b upon receipt of a data pulse from the I/O device 15, a voltage V1=I1×Rv×R1/(Rv+R1) is applied to the D1-terminal of the microcomputer 24, wherein Rv is a value of the variable resistance 108, and R1 is the value of the fixed resistance 109.

When the switch 113 is turned OFF, the microcomputer 24 executes the photographic sequence and sets the O2-terminal to a low (L) voltage level, whereupon the transistor 110 is turned OFF. As a result, the voltage V1 at the D1-terminal becomes V1=I2×Rv in response to a photo-transistor 6b when the bar code data signal is received thereon.

For example, where the variable resistance 109 is set at 80 KΩ and the fixed resistance 109 is 5 KΩ, the composed resistance of the converter 36A effective for the data signal from the I/O device 15, i.e., Rv×R1/(Rv+R1) is about 4.7 KΩ. On the other hand, for the bar code data signal, the converter 36A has an effective resistance of Rv=80 KΩ. Therefore, the amplification factor for the bar code data signal is about 17 times as large as that for the data signal from the I/O device 15.

Since the charge stored in the base of the photo-transistor 6b is discharged more slowly as the effective resistance increases, the response speed becomes the slower as the amplification factor increases. Consequently, the response speed of the converter 36A for the signal from the I/O device 15 is certainly higher than that for the bar code data signal.

Figure 23:
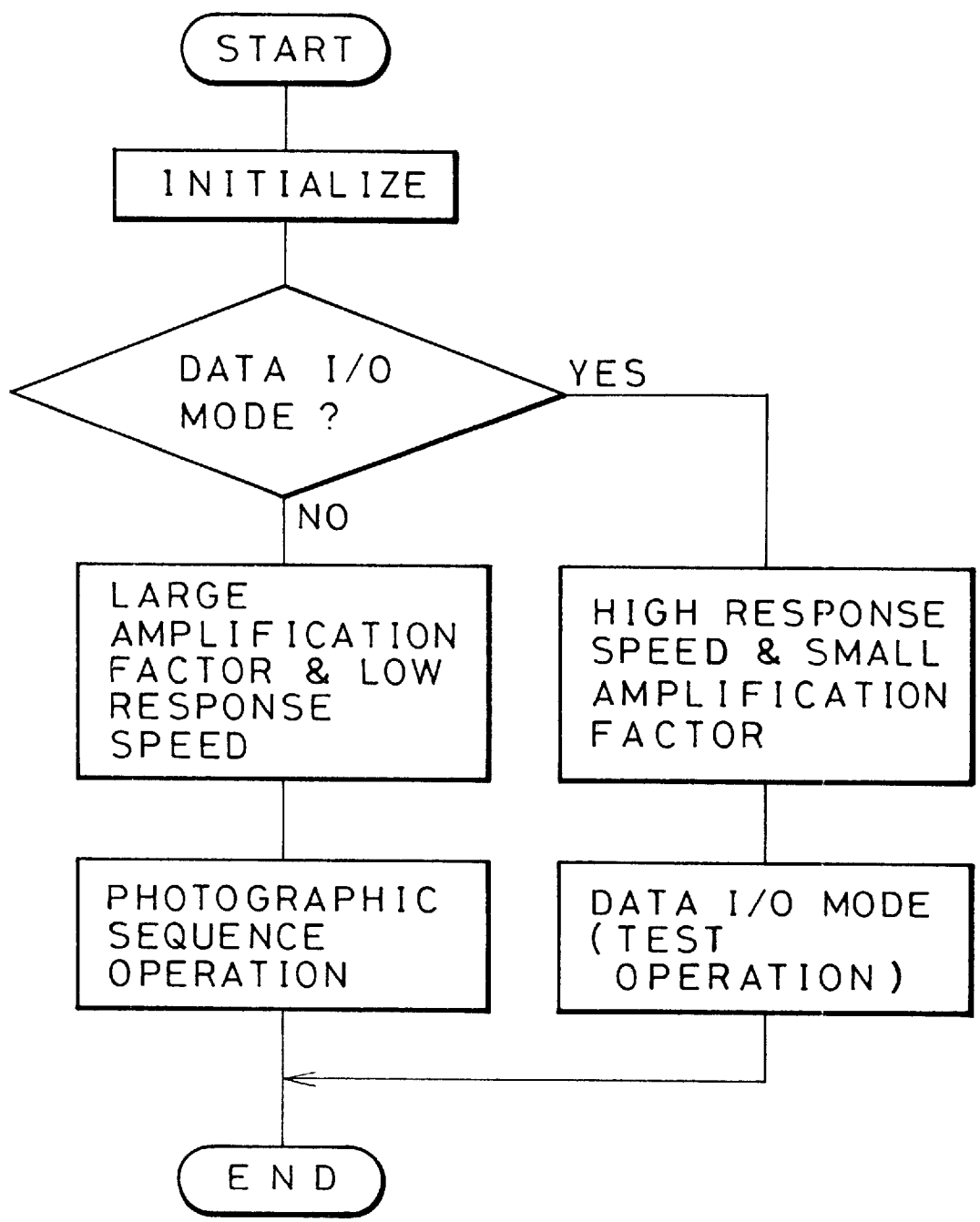
FIG. 23 is a flow chart illustrating the operation of the embodiment of FIG. 22.

FIG. 23 shows a program executed by the microcomputer 24 for changing the amplification factor and the response speed of the converter 26A according to whether it is the data I/O mode or not, that is, in response to the switching condition of the switch 113.

In this program, the microcomputer 24 is first initialized, and then determines whether the switch 113 is ON or OFF. If the switch 113 is turned ON, the microcomputer 24 sets the O2-terminal to the H level. Thus, the amplification factor of the converter 36A is reduced, and so the response speed of the converter 36A is increased. Simultaneously, the microcomputer 24 gets read for processing the data signal from the I/O device 15.

If the switch 113 is OFF, the microcomputer 24 determines that the camera is to be set in the photographic sequence mode, and sets the O2-terminal to the L level. Thus, the amplification factor of the converter 36A is increased, and so the response speed of the converter 36A is lowered. Simultaneously, the microcomputer 24 gets read for processing the bar code data signal from the bar code disc 4.

Figure 24:
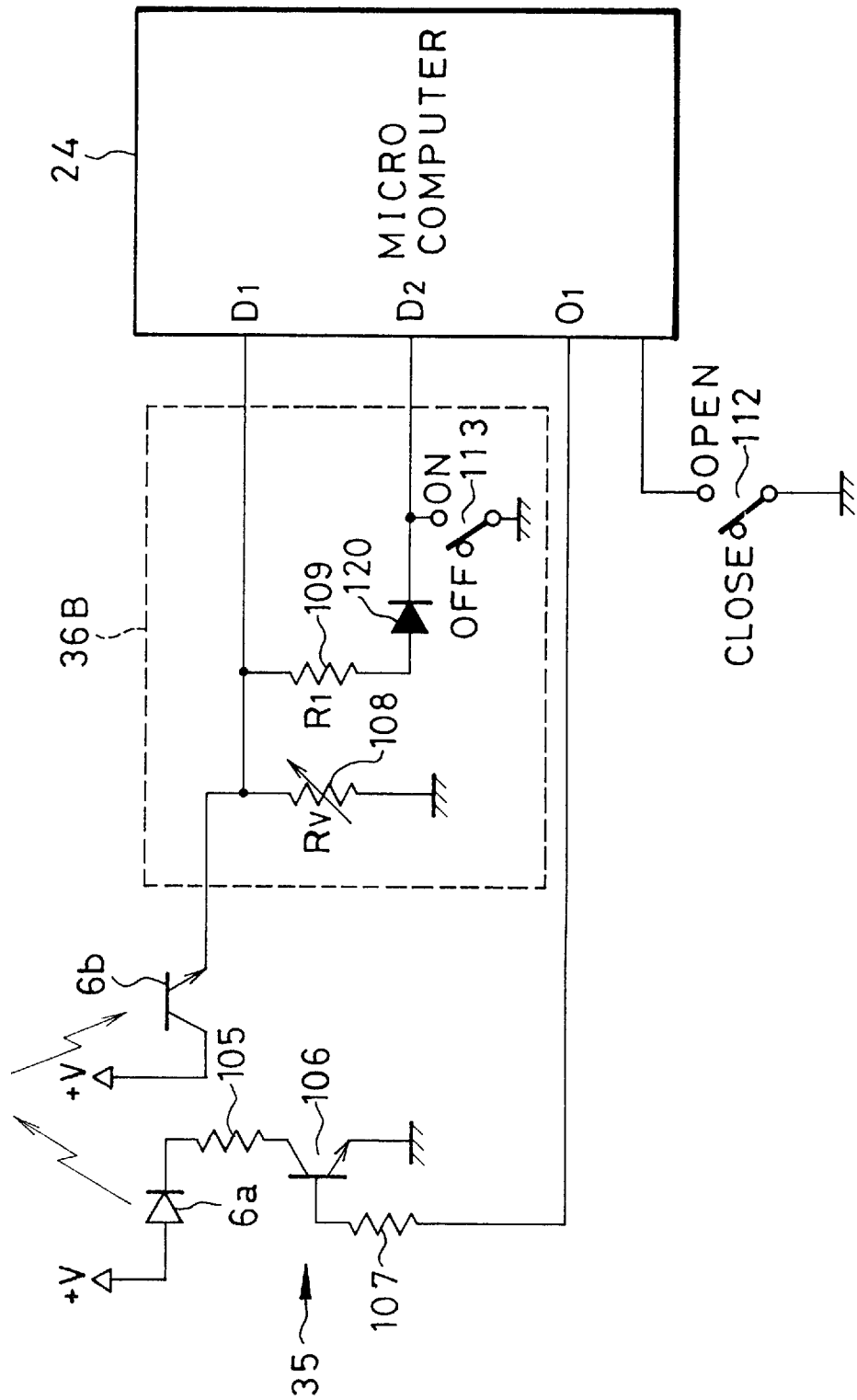
FIG. 24 is a circuit diagram similar to FIG. 22, but illustrating another embodiment of the present invention.

In the embodiment shown in FIG. 24, a converter 36B does not include the transistor 110. Instead, the fixed resistance 109 is connected to the anode of a diode 120 whose cathode is grounded through the switch 113. The cathode of the diode 120 is also connected to another input terminal D2 of the microcomputer 24.

According to this embodiment, when the switch 113 is turned ON, the current flows through the fixed resistance 109, the diode 120 and the switch 113 to the earth, so that the voltage level at the I1-terminal of the microcomputer 24 will be V1=I1×Rv×R1/(Rv+R1) when the current I1 is detected by the photo-transistor 6b. If, on the other hand, the switch 113 is OFF, the current will not flow to the fixed resistance 109 so that the voltage level at the I1-terminal will be V1=I2×Rv when the current I2 is detected by the photo-transistor 6b. Consequently, the amplification factor and the response speed of the converter 38B are changed between the data I/O mode and the photographic sequence mode, in the same way as for the embodiment of FIG. 22. In the embodiment of FIG. 24, the microcomputer 24 monitors the switching condition of the switch 113 through the D2-terminal, because the voltage level at the D2-terminal drops down when the switch 113 is turned ON.

The switch 113 may be turned ON and OFF either directly or in response to a predetermined combination of several switches, such as the combination of the frame size switch 9, the shutter button 8 and the photo-mode switch 10.

Although the effective resistance value of the converter 36A or 36B varies depending on the switching condition of the switch 113 only, it is possible to take account of the switching condition of a lid switch 112 in combination, providing that the lid of switch 112 is turned ON only while the lid 2a of the cassette chamber 2 of the camera is open.

This alternative is desirable in order to make the operation reliable, because the lid 2a must be kept opened while the plug-in unit 17 of the I/O device 15 is inserted in the cassette chamber 2 for executing a test operation in the data I/O mode. On the contrary, the lid 2a must be closed in order to read the bar code disc 4 of the photographic film cassette 5 inserted in the cassette chamber 2.

Figure 25:
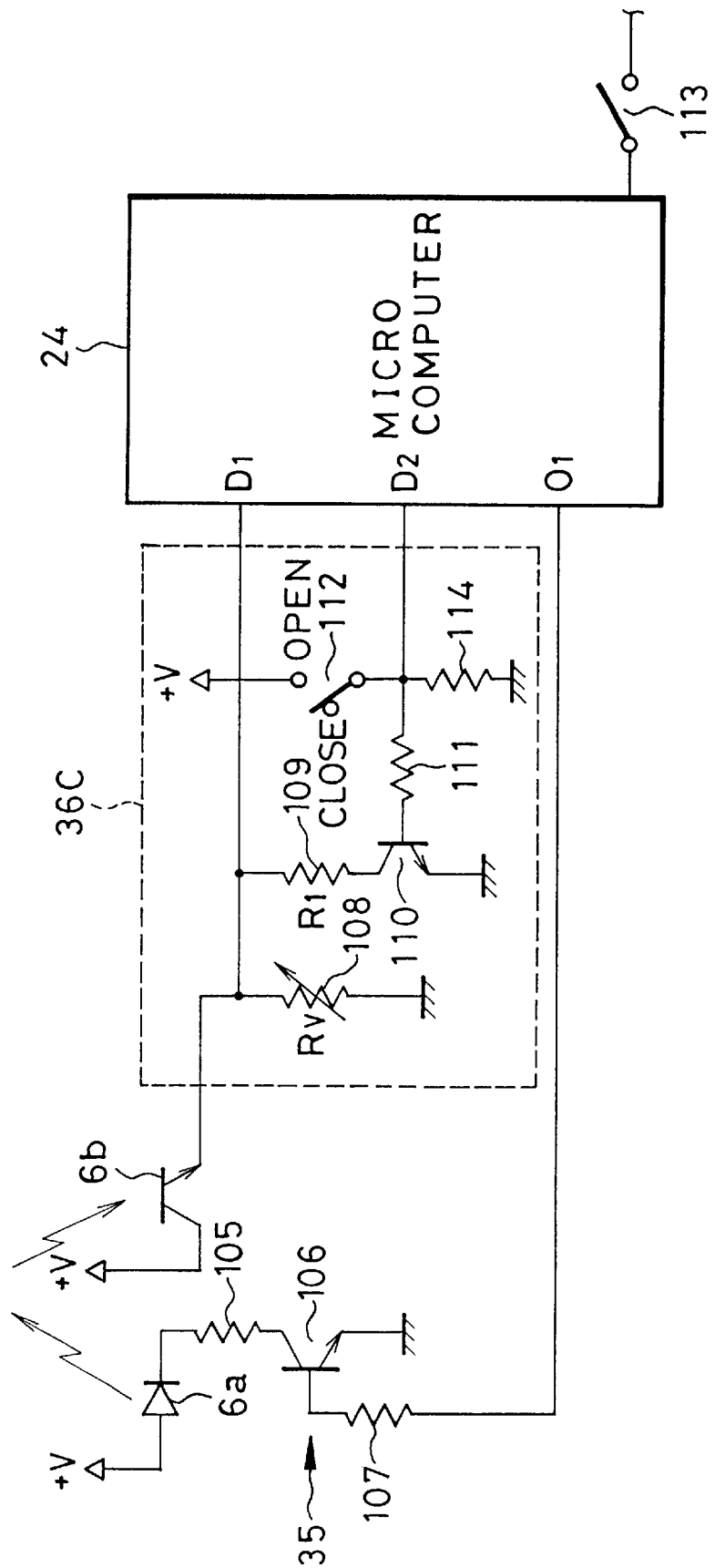
FIG. 25 is a circuit diagram similar to FIG. 22, but illustrating a further embodiment of the present invention.
Figure 26:
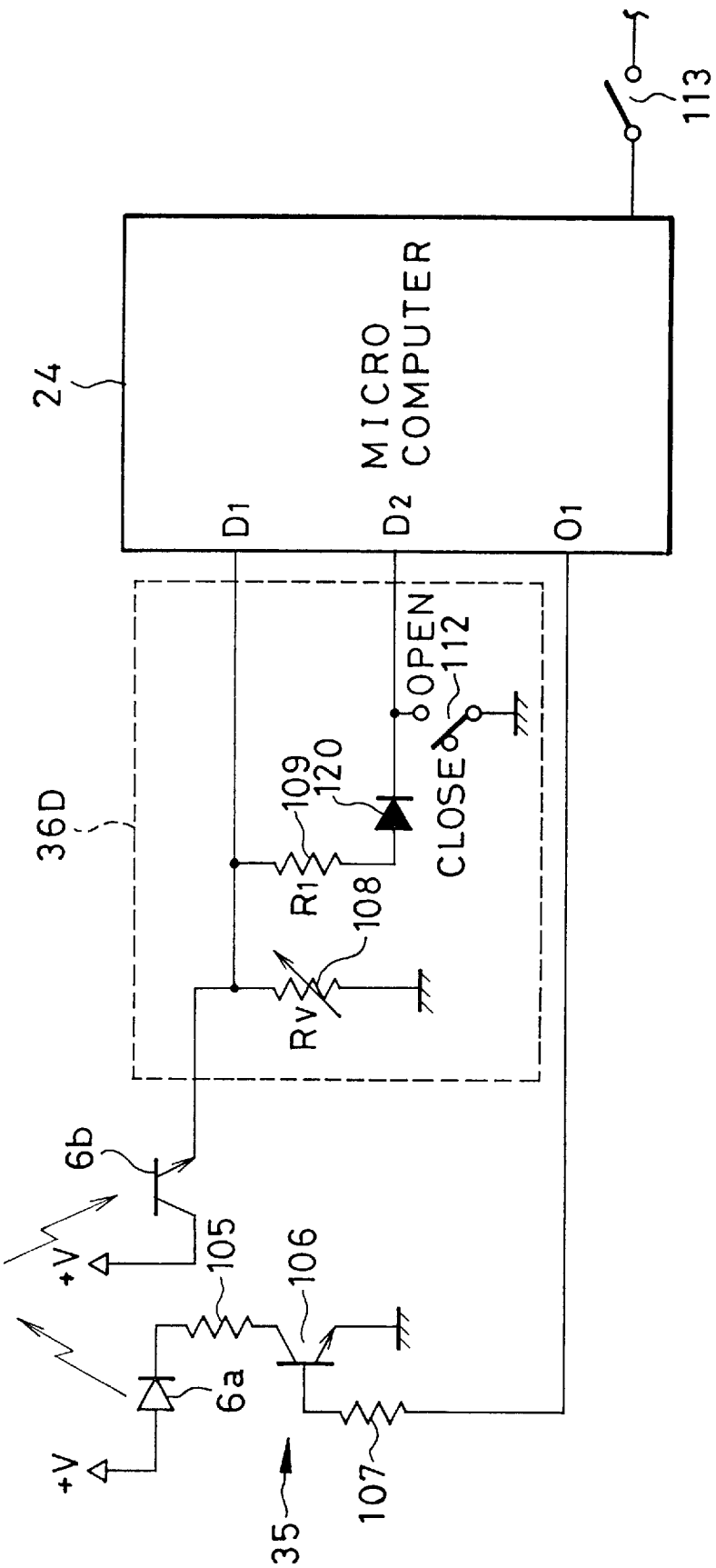
FIG. 26 is a circuit diagram similar to FIG. 22, but illustrating still another embodiment of the present invention.

Accordingly, it is also possible to change the effective resistance of a converter in response to the switching condition of the lid switch 112, in a manner as shown in FIG. 25 or 26.

A converter 36C shown in FIG. 25 basically corresponds to the converter 36A of the embodiment shown in FIG. 22, but the lid switch 112 and a resistance 114 are connected to the base resistance 111 of the transistor 110 such that the transistor 110 is turned ON when the lid switch 112 is open. The base resistance 111 is connected to the input terminal D2 of the microcomputer 24 so that the microcomputer 24 monitors the switching condition of the lid switch 112. In this case, the D2-terminal is set to a high voltage level when the lid switch 112 is turned ON.

Figure 27:
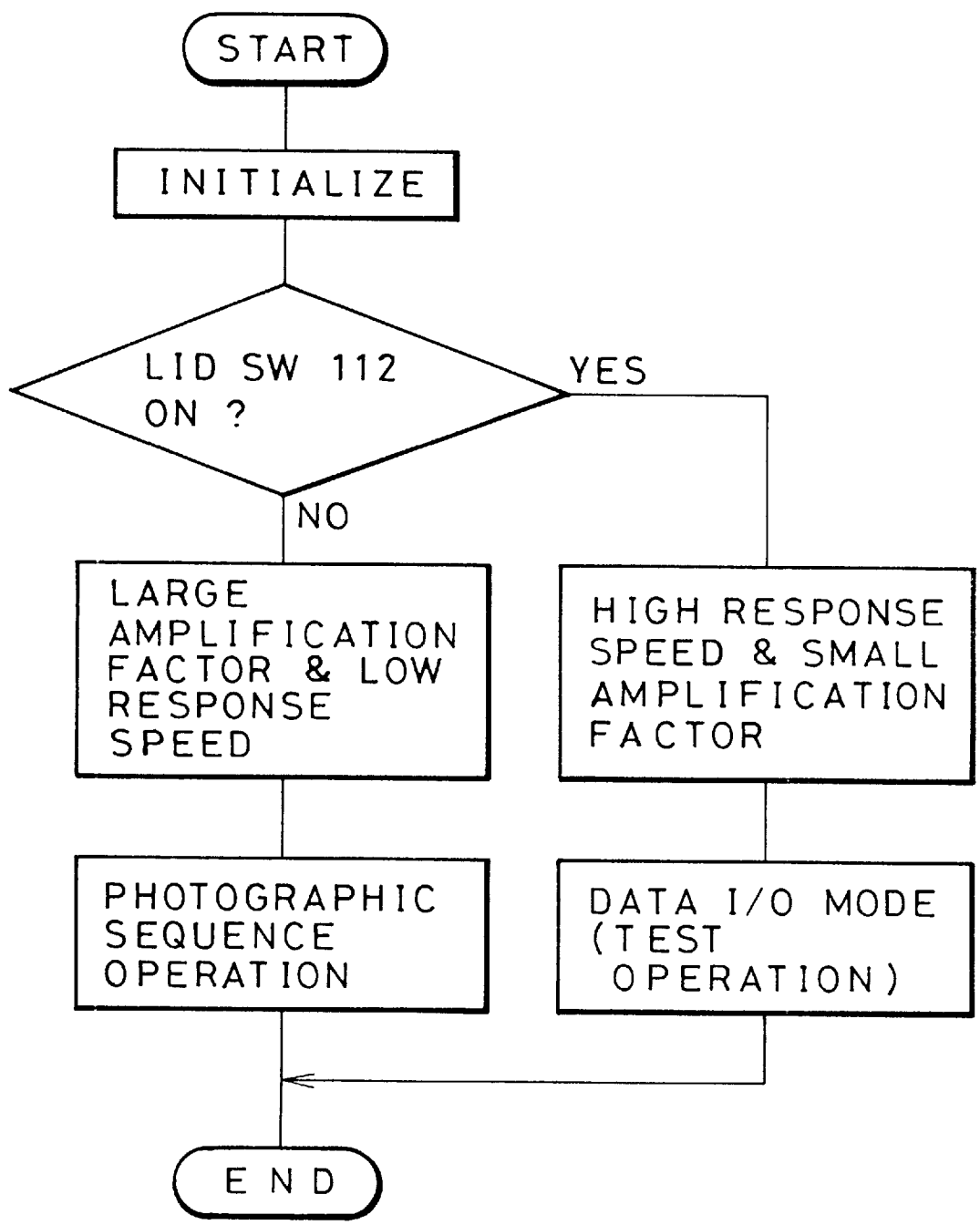
FIG. 27 is a flow chart illustrating the operation of the embodiments of FIGS. 25 and 26.

A converter 36D shown in FIG. 26 corresponds to the converter 36B of the embodiment shown in FIG. 24 except the switch 113 is replaced by the lid switch 112. FIG. 27 schematically illustrates the operation of the embodiments of FIGS. 25 and 26. Also in these embodiments, it is preferable that the microcomputer 24 takes account of the switching condition of the switch 113 or other switches in combination with the switching condition of the lid switch 112.

The construction of the converter for the photoelectric signal of the photo-sensor 6 is not limited to the above embodiments. For example, the construction of the converter may be adapted to the types of signals to be processed.

The switching operation of the converter may be executed by a signal generation circuit in hardware form, instead of the microcomputer 24.

Although the above embodiments change the circuit construction by switching over the impedance of an element which is connected to the emitter of the photo-transistor 6b, it is alternatively possible to connect such an impedance-switching element to the collector of the photo-transistor 6b.

Of course, the present invention is applicable to a camera which is capable of only reading data, although the above embodiments relate to a camera capable of both reading and writing data.

Now the details of the serial transfer device 43 will be described.

The serial transfer device 43 has an error detecting and correcting function and a rerun or resending function to permit serial transfer of input data and output data by using the same reflective photo-sensors. The serial transfer device 43 also has an anti-collision function to avoid outputting data concurrently in both directions, and a handshaking function to discontinue data sending when no receipt of data is acknowledged.

Figure 11:
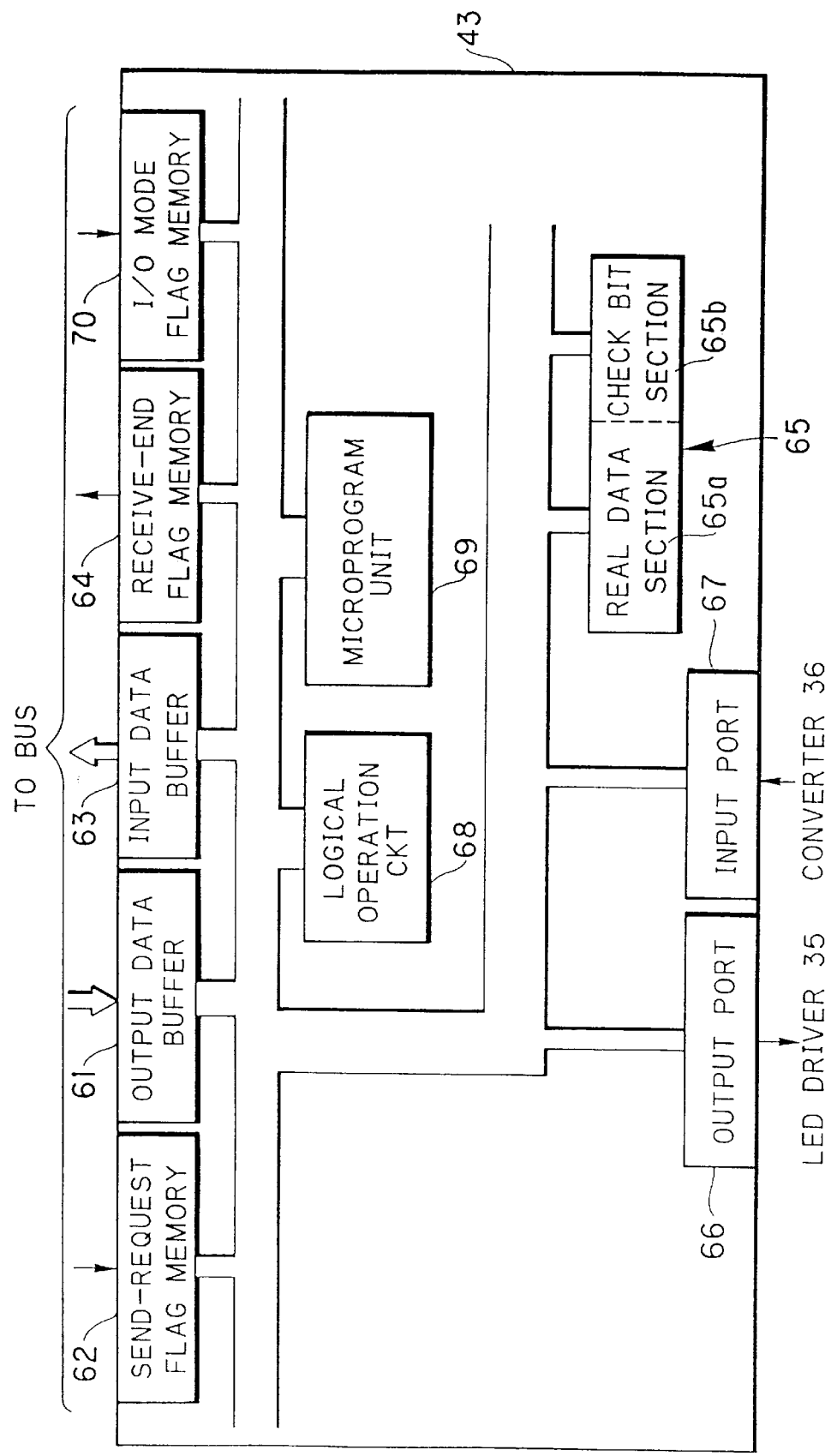
FIG. 11 is a block diagram of a serial transfer device shown in FIG. 3.

Referring to FIG. 11, the serial transfer device 43 includes an output data buffer 61 which may store 16 bits (2 bytes) of data to be outputted from the microcomputer 24 to an external device. The microcomputer 24 sets a send-request flag or binary "1" in a flag memory 62 simultaneously with storing the output data in the output data buffer 61. The microprogram unit 69 of the serial transfer device 43 resets the send-request flag or resets the flag memory 62 to binary "0" when all the data is sent from the output data buffer 61.

Thus, the serial transfer device 43 determines with reference to the send-request flag if there is any output data in the output data buffer 61.

Input data buffer 63 may store data to be inputted in the microcomputer 24, which is received on the serial transfer device 43 from an external device. The microprogram unit 69 of the serial transfer device 43 sets a receive-end flag or binary "1" in a flag memory 64 simultaneously with storing the input data in the input data buffer 63. The microcomputer 24 resets the receive-end flag or resets the flag memory 64 to binary "0" when all the data is sent from the input data buffer 63 to the microcomputer 24. Thus, the microcomputer 24 determines with reference to the receive-end flag if there is any input data in the input data buffer 63.

A transfer buffer 65 is provided to temporarily store both output and input data in a step of processing. The transfer buffer 65 includes a real data section (16 bits) 65a and a check bit section (5 bits) 65b. An output port 66 and an input port 67 are each one-bit ports, and are connected to the LED driver 35 and the converter 36, respectively. A logical operation circuit 68 carries out various operations for data comparison, data check, error detection, error correction and so forth. A microprogram unit 69 controls the buffers 61, 63 and 65 and other elements of the serial transfer device 43 to carry out the above-mentioned functions of the serial transfer device 43. An I/O mode flag memory 70 is set or reset by the microcomputer 24 depending on whether or not the camera 1 is set in the data I/O processing mode, respectively.

Figure 12:
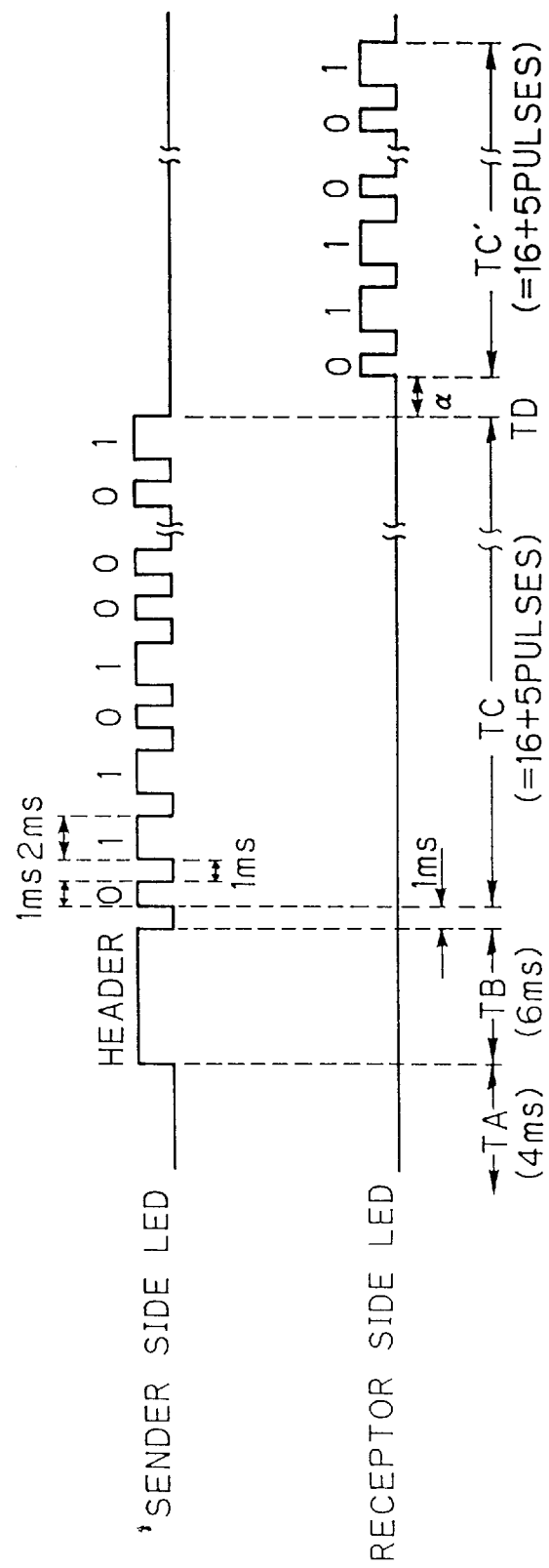
FIG. 12 is timing charts of light pulses emitted from LEDs of the camera and the input/output device.

Since the same serial transfer device as shown in FIG. 11 is mounted in the input/output device 15, data communications between the camera 1 and the input/output device 15 is performed in a manner as shown in FIG. 12. It is predetermined that the intermittent light from the LED 6a or 22a, hereinafter referred to as light pulses, will not be interrupted more than 2 ms during sending one block (=16 bits). Accordingly, it is possible to determine the end of sending of one block when the light pulses have been interrupted for more than 2 ms. Therefore, the data sending process starts with checking to confirm that the light pulses have been interrupted for 4 ms (TA) Then, a header having a width of 6 ms (TB) is outputted to indicate the start or leading end of one block. The header is followed by 16 light pulses spaced 1 ms from one another, each of the 16 pulses has a width of 2 ms or 1 ms to represent binary "1" or "0", respectively. In this way, 16 bits real data is sent as a light pulse signal. In addition to the 16 light pulses, 5 light pulses corresponding to five check bits are sent in the same way as the 16 bits data (TC). These check bits are based on a conventional error detecting and correcting method using hamming codes, and are capable of detecting errors of not more than 2 bits as well as correcting 1-bit error within one block.

When the 21 light pulses (a time TD) have been completely sent, then the serial transfer device 43 of the sender waits for acknowledge pulses (TC') from the receptor side. If the receptor side operates normally, the acknowledge pulses start being sent within 2 ms after the time TD ($\alpha$<2 ms). Therefore, if the first light pulse of the acknowledge pulses is not received within 2 ms after the time TD ($\alpha$>2 ms), the sender determines that the receptor cannot receive any data. Even of the sender receives a pulse from the receptor after this stand-by period of 2 ms is over, the pulse may not be regarded as the acknowledge pulse, but as a first pulse of a new series of data, which might start to be sent when the time TA (=4 ms) has passed since the end (TD) of the preceding data output process. In either case, the data is not properly transferred. If the sender receives the first pulse within 2 ms from the time TD, and the content of the pulses TC' from the receptor is identical to that of the pulses TC from the sender, exclusive of the header TB, the sender may determine that the output data is properly transferred.

Figure 13:
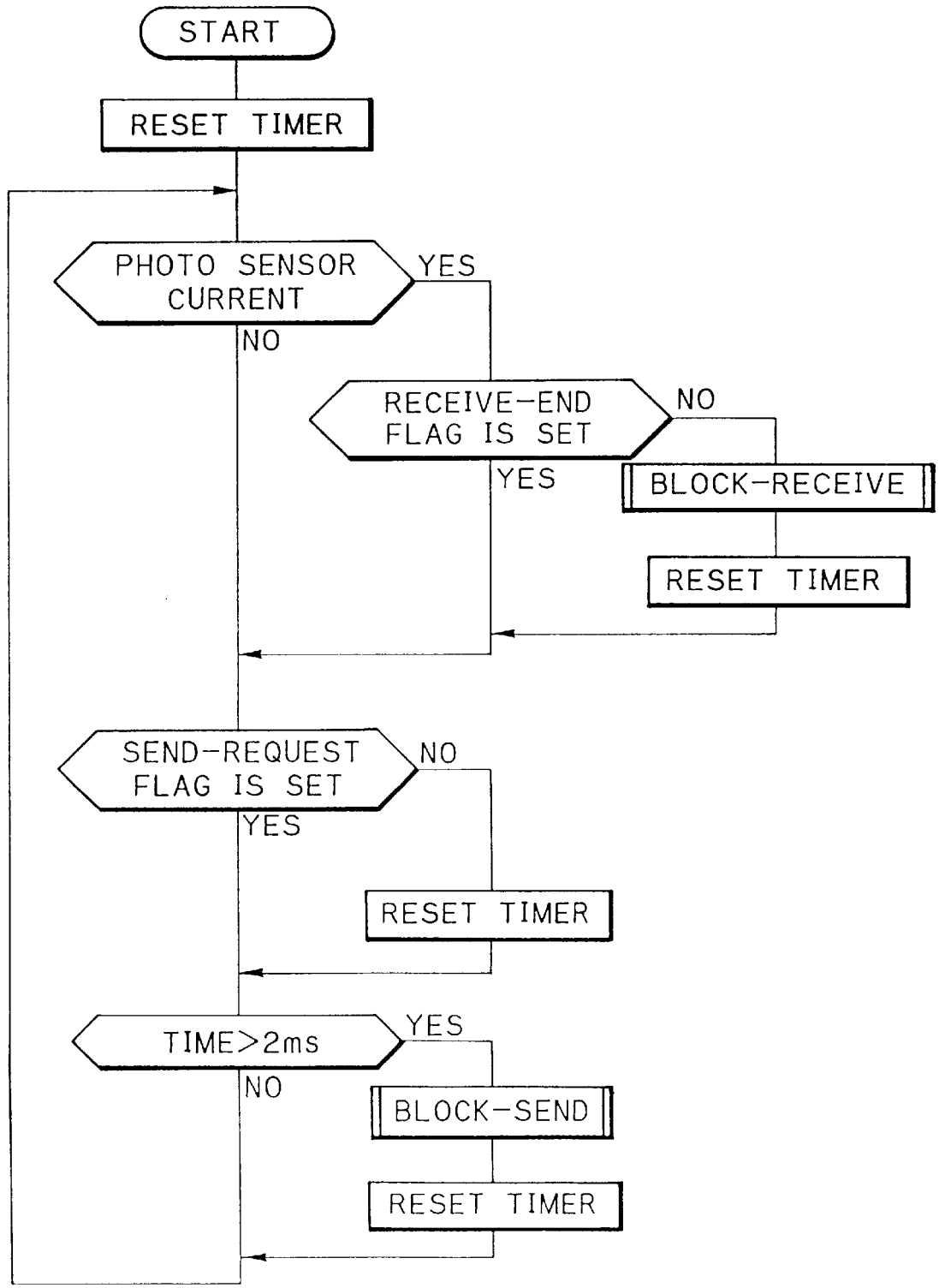
FIG. 13 is a flow chart illustrating the sequence of a main routine executed by a microprogram unit included in the serial transfer device.

The microprogram unit 69 controls the respective elements of the serial transfer device 43 according to a sequence shown in FIG. 13. First, a timer is reset to start timing from zero. When the photo-sensor 6 or 22 detects current while the receive-end flag memory 64 is reset, the microprogram unit 69 starts the "block-receive" process for receiving one block. When the "block-receive" process is accomplished, the microprogram unit 69 resets the timer again. For easy understanding, the following description relates to the serial transfer device 43 of the camera 1, although the serial transfer device of the input/output device 15 operates in the same way.

If the receive-end flag is not reset, since it means that input data remains in the input data buffer 63, further data will not be received even when the photo-sensor 6 detects current. In this case, though the input/output device 15 continues to send data, the input/output device 15 finally recognizes that the data sent therefrom has not been properly received, as it is getting no acknowledge pulse from the camera 1.

If at that time the send-request flag is reset, the microprogram unit 69 resets the timer. If the send-request flag is set, and when the timer runs over 2 ms, the microprogram unit 69 starts "block-send" program for sending one block. The timer is reset to zero when the "block-send" program is terminated.

Figure 14:
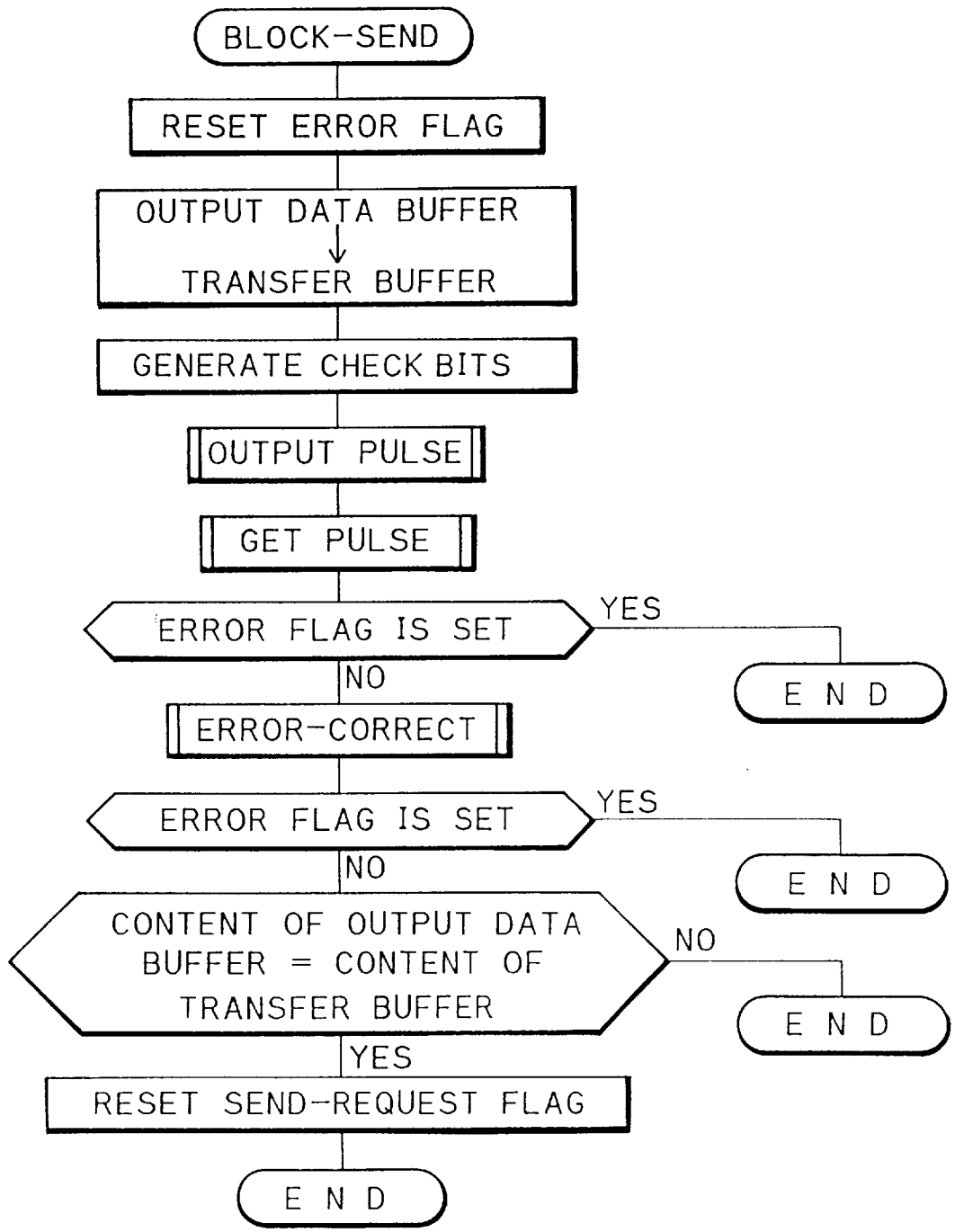
FIG. 14 is a flow chart illustrating the sequence of a subroutine for sending data blocks in the serial transfer device.
Figure 15:
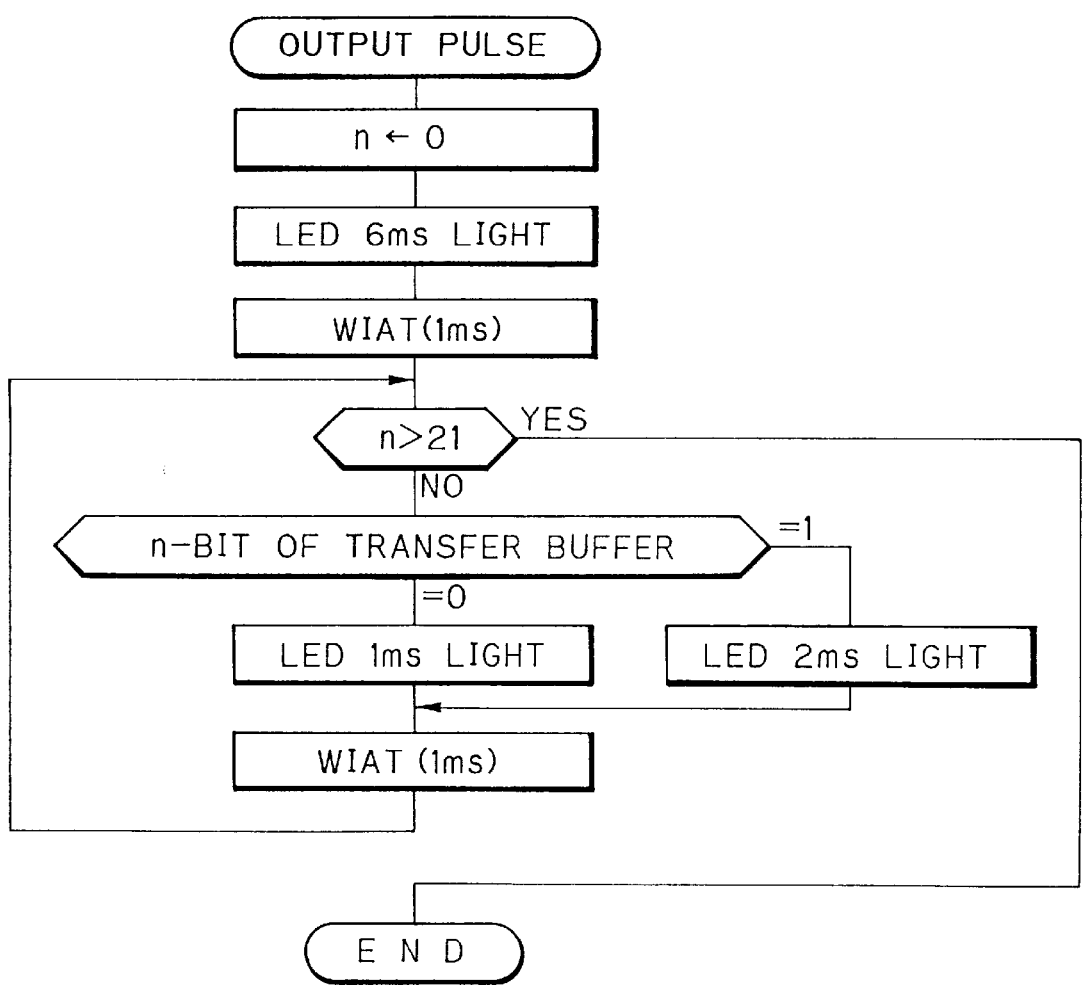
FIG. 15 is a flow chart illustrating the sequence of a subroutine for outputting pulses in the serial transfer device.

The "block-send" program is executed in a subroutine as shown in FIG. 14. First, if any error flag is set, the microprogram unit 69 resets the error flag. Then, the content of the output data buffer 61 is transferred once to the real data section (0-bit to 15-bit) of the transfer buffer 65. Thereafter, check bits are calculated with reference to the content of the 0 to 15-bit of the transfer buffer 65, and are transferred to 16 to 21-bit of the transfer buffer 65. Next, the 21-bit content of the transfer buffer 65 is transferred to the input/output device through the reflective photo-sensors 6 and 22 in the method as described with reference to FIG. 12, in a subroutine for "output pulse" process as shown in FIG. 15.

Figure 16:
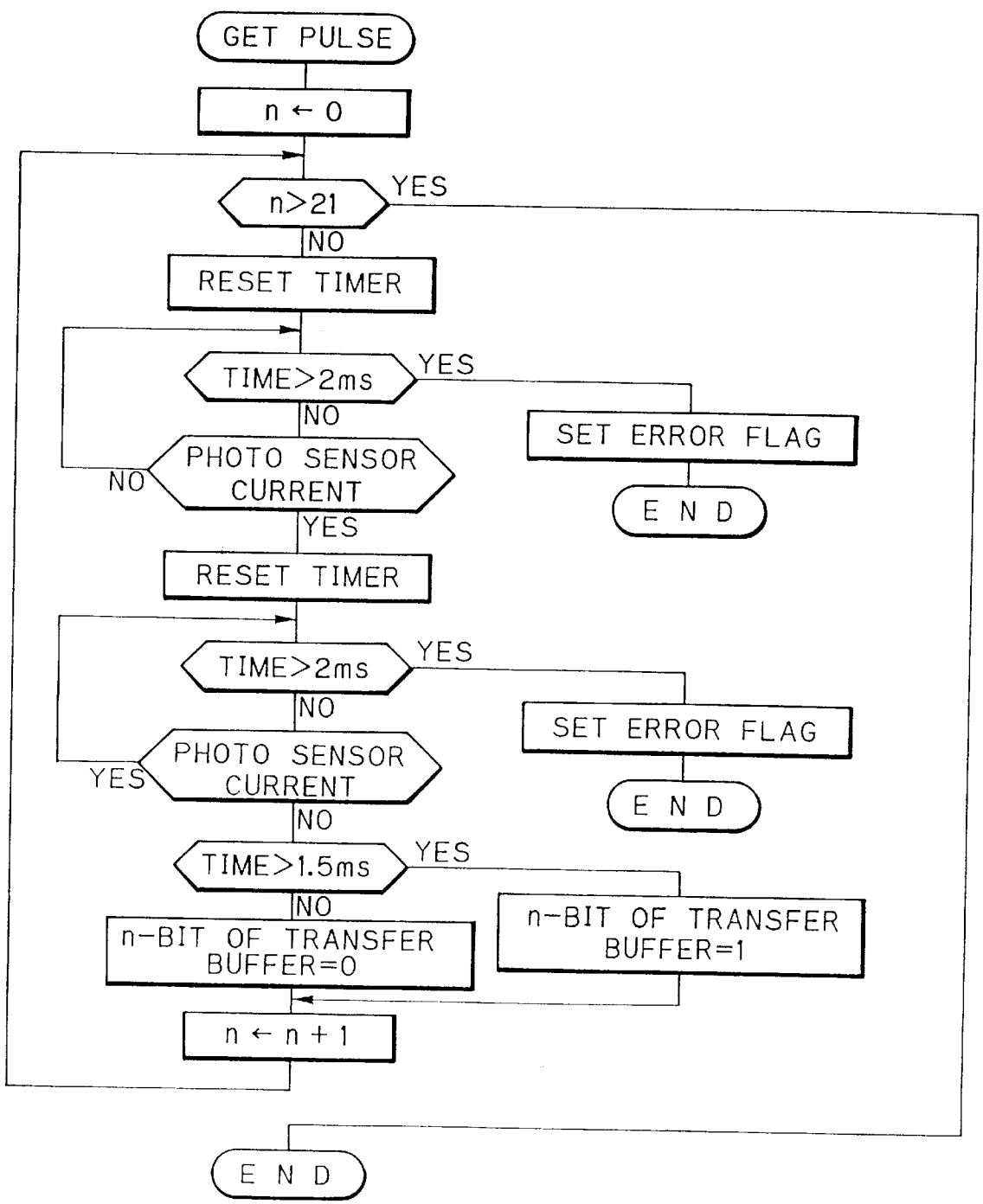
FIG. 16 is a flow chart illustrating the sequence of a subroutine for getting pulses in the serial transfer device.

Thereafter, "get pulse" process is executed in a subroutine as shown in FIG. 16. If the first acknowledge pulse is not detected in 2 ms from the end of the preceding "output pulse" process, it means that the input/output device 15 cannot receive any data at present. Therefore, the microprogram unit 69 sets an error flag, and terminates the "get pulse" subroutine to return to the main routine. If the input/output device 15 cannot receive data because it is waiting for a chance to start a "block-send" process, the input/output device 15 starts sending a data block when 4 ms has passed since the camera 1 discontinued the data sending. Because the serial transfer device 43 of the camera 1 has returned to the main routine in this stage, the data from the input/output device 15 is properly received in the "block-receive" process.

When the first acknowledge pulse is detected, its pulse width is compared with a reference value of 1.5 ms. If the pulse width is more than 1.5 ms, it is regarded as 2 ms, so that binary "1" is set in the 0-bit of the transfer buffer 64. If the pulse width of the first acknowledge pulse is less than 1.5 ms, it is regarded as 1 ms, so that binary "0" is set in the 0-bit of the transfer buffer 65.

Then, the next acknowledge pulse is detected to set the next bit of the transfer buffer 65 in the same way as for the first acknowledge pulse. If no following pulse is detected within 2 ms, the microprogram unit 69 sets an error flag to terminate the "get pulse" subroutine, because it means that the acknowledge pulses are not properly transferred for some reason. If the pulse having a width of more than 2 ms is detected during the "get pulse" process, the microprogram unit 69 sets an error flag, and terminates the "get pulse" subroutine. Such an error may happen when the input/output device 15 starts data sending and outputs a header by mistake.

Figure 17:
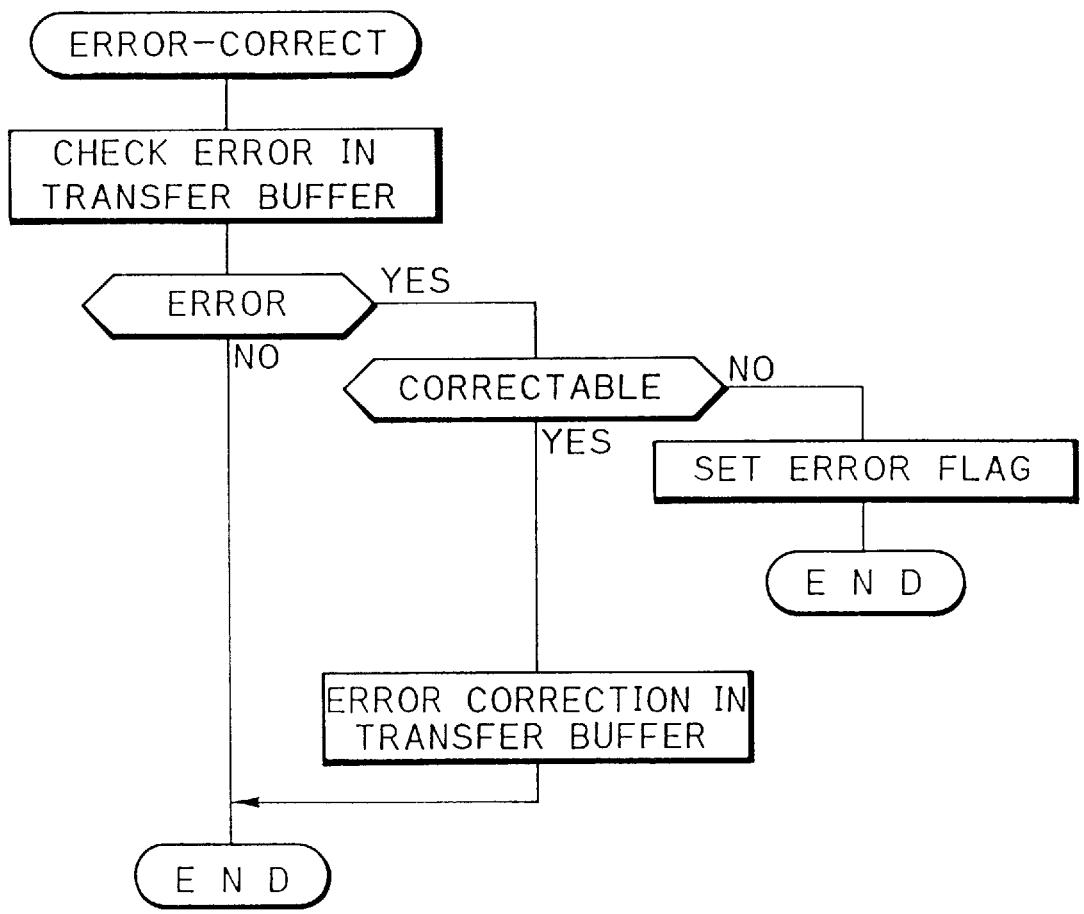
FIG. 17 is a flow chart illustrating the sequence of a subroutine for correcting error in the serial transfer device.

The above process is repeated to measure each width of 21 pulses and to set binary "1" or "0" in the corresponding bit position of the transfer buffer 65. When the acknowledge pulses are completely read in the transfer buffer 65, then error detection and correction on the data in the transfer buffer 65 is carried out in a manner as shown in FIG. 17. If it is determined in this "error-correct" process that there is an error that is not correctable, an error flag is set, and the "block-send" subroutine is terminated.

If there is no error detected, or all error is corrected in the "error-correct" process, the contents of the 0 to 15-bit of the transfer buffer 65 are compared with the contents of the output data buffer 61. If these contents are different, the microcomputer 69 sets an error flag, and terminates the "block-send" subroutine. Since the send-request flag remains set in the flag memory 62 after an error flag is set to interrupt the "block-send" process, the "block-send" process will start again as soon as the requirements are filled in the main routine. When the "block-send" process is accomplished with no error, the send-request flag memory 62 is reset to zero to inform the microcomputer 24 of the completion of data output or block sending.

Figure 18:
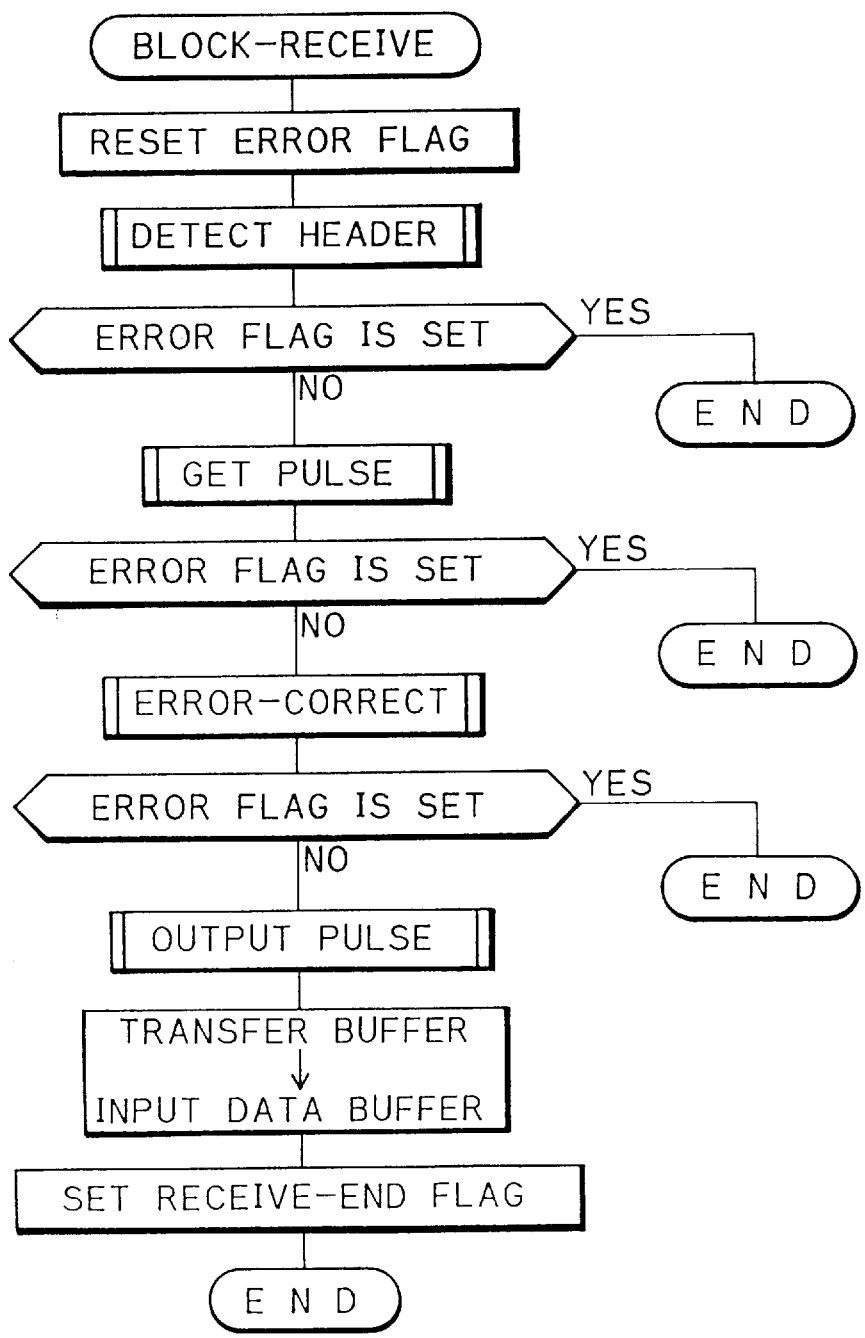
FIG. 18 is a flow chart illustrating the sequence of a subroutine for receiving data blocks in the serial transfer device.
Figure 19:
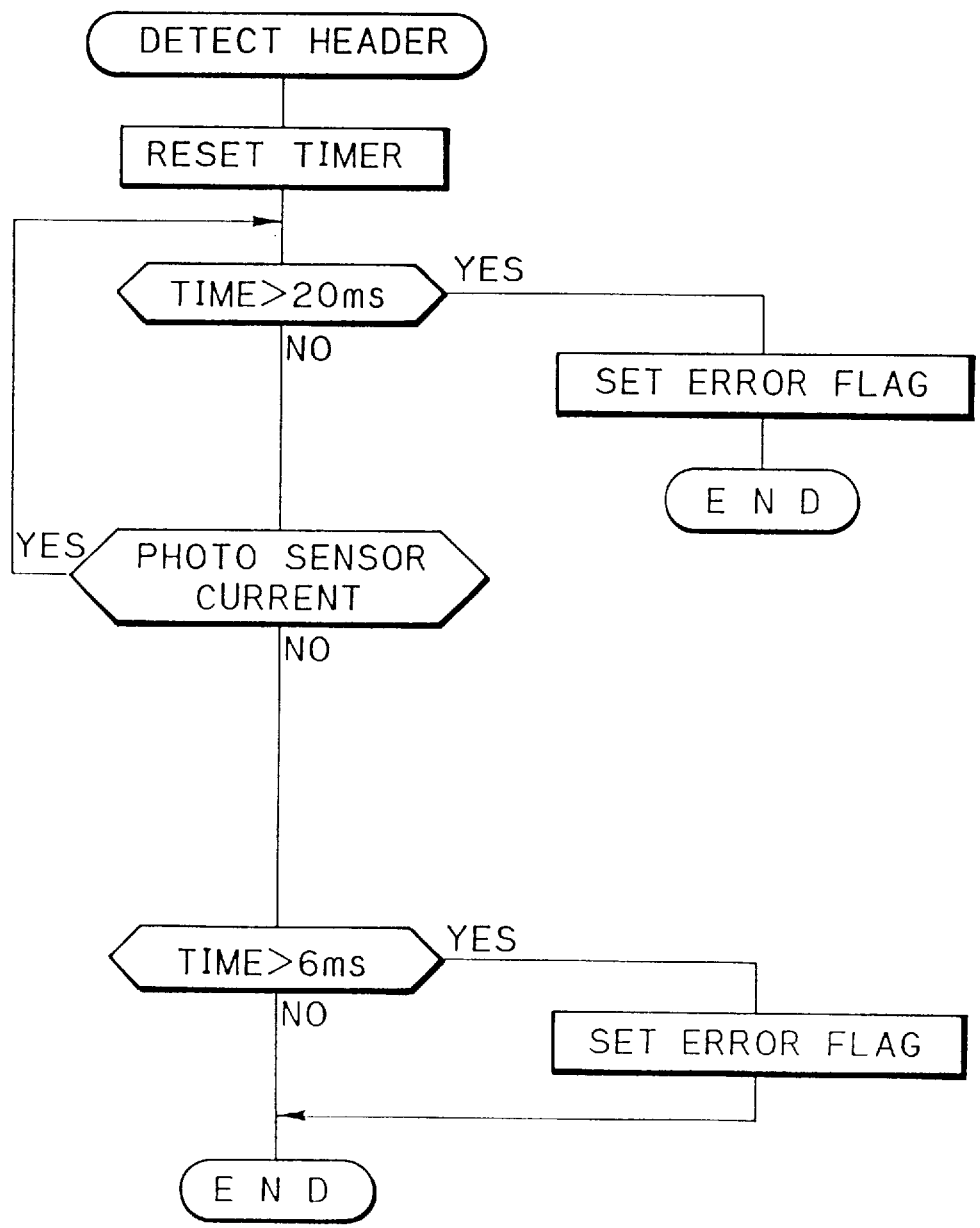
FIG. 19 is a flow chart illustrating the sequence of a subroutine for detecting a header pulse in the serial transfer device.

The "block-receive" process is also executed in a subroutine as shown in FIG. 18. First, if any error flag has been set, the microprogram unit 69 resets the error flag. Next, a header sent from the sender, i.e., the input/output device 15 in the this instance is detected in "detect-header" process which is executed in a sequence as shown in FIG. 19. That is, the width of the pulse that has just been detected through the photo-sensor 6 is measured. If the pulse width is less than 6 ms or more than 20 ms, an error flag is set, and the "detect header" process is terminated. If the pulse width is not less than 6 ms or not more than 20 ms, the pulse is determined to be a header.

Thereafter, 21 pulses following the header are read to set binary "1" or "0" in the 0–21-bit of the transfer buffer 65 depending on the pulse width of each of the 21 pulses, in the same way as the "get-pulse" process shown in FIG. 16. If an error pulse is set in the "get-pulse" process, the "block-receive" subroutine is terminated to return to the main routine. When the "get-pulse" process is properly accomplished, then error detecting and correcting process is executed on the data stored in the transfer buffer 65 in the same way as the "error-correct" process shown in FIG. 17.

If there is no error in the content of the transfer buffer 65, the content is sent back to the input/output device 15 as acknowledge pulses in the same way as the above-described "output pulse" process. It is to be noted that the time interval from the end of the "get pulse" process to the start of the "output pulse" process must be set at about 1 to 2 ms in accordance with the rule described with reference to FIG. 12. If this time interval is too long, the input/output device 15 would consider that the camera 1 does not properly receive the data. But if it is too short, the input/output device 15 could not reliably detect the acknowledge pulse.

Even after an error flag is set to interrupt the "block-send" process, since the send-request flag memory 62 has been set to "1", the "block-receive" process will start again as soon as the requirements are filled in the main routine. When the "block-receive" process is accomplished with no error, the content of the 0 to 15-bit of transfer buffer 65 is copied in the input data buffer 63. Then, the receive-end flag is set in the memory 64 to request the microcomputer 24 to read the data from the input data buffer 63.

In this way, the above-described serial transfer devices allow data to be transferred in either direction between the camera 1 and the input/output device 15 through the reflective photo-sensors 6 and 22 by opposing the sensors 6 and 22 to each other, even though the reflective photo-sensors 6 and 22 can not simultaneously send or emit light. Moreover, the sender may check if the receptor has properly received the data, or if it is allowable to send the next series of data. For example, if the sender, for instance the input/output device 15, starts sending data or commands during the memory dumping of the camera 1, the microcomputer 24 can unfailingly read the data or command after completing the memory dumping, because the data or command is stored in the input data buffer 63 until the microcomputer 24 completes data reading from the input data buffer 63. Thereafter, the microcomputer continues to operate in accordance with the predetermined sequence. Besides that, the sender is prevented from sending the next block until the microcomputer 24 completes the memory dumping and reading of the input data buffer 63.

When the camera 1 is set in an ordinary photographic sequence mode, that is, out of the data I/O mode by turning the photo-mode switch 10 OFF, and/or setting the frame size switch 9 in the position "L" or "H", or entering a monitor code "0", the I/O mode flag memory 70 is reset to zero. Whereby, the serial transfer device 43 does not execute data transfer between the buffers 61, 63 and 65, but sends the value of the flag memory 62 directly to the output port 66, while the microcomputer 24 sets or resets the flag memory 62 to activate or inactivate the LED 6a.

While the LED 6a thus emits light in the photographic sequence mode, light reflected from the bar code disc 4 of the cassette 5 is received on the photo-transistor 6b, and the photoelectric current is converted into a voltage signal and is compared with the reference level to be converted into a digital signal or binary code data through the converter 36. The voltage signal inputted through the input port 67 is sent directly to the flag memory 64, so that the microcomputer 24 reads the value of the flag memory 64 one after another as data read from the bar code disc 4.

Although the above described serial transfer device is construed as hardware with a microprogram unit, it is possible to conduct the same function as above by utilizing an interrupt function of the microcomputer 24 or the like of the camera 1 or the input/output device 15. Although light pulses are transmitted according to a conventional pulse width modulation method wherein the pulse width varies depending on the level of each bit of the binary code, it is possible to adopt a conventional start-stop system or synchronous transmission method which is based on a constant clock. It is also possible to provide two photo-sensors in an external input/output device for use with those cameras which have more than one photo-sensor, so as to use one photo-sensor especially for sending and receiving constant clock in the start-stop system. In the alternative, one photo-sensor may be used for sending only, while the other for receiving only, so as to permit transferring data simultaneously in both directions.

Figure 20:
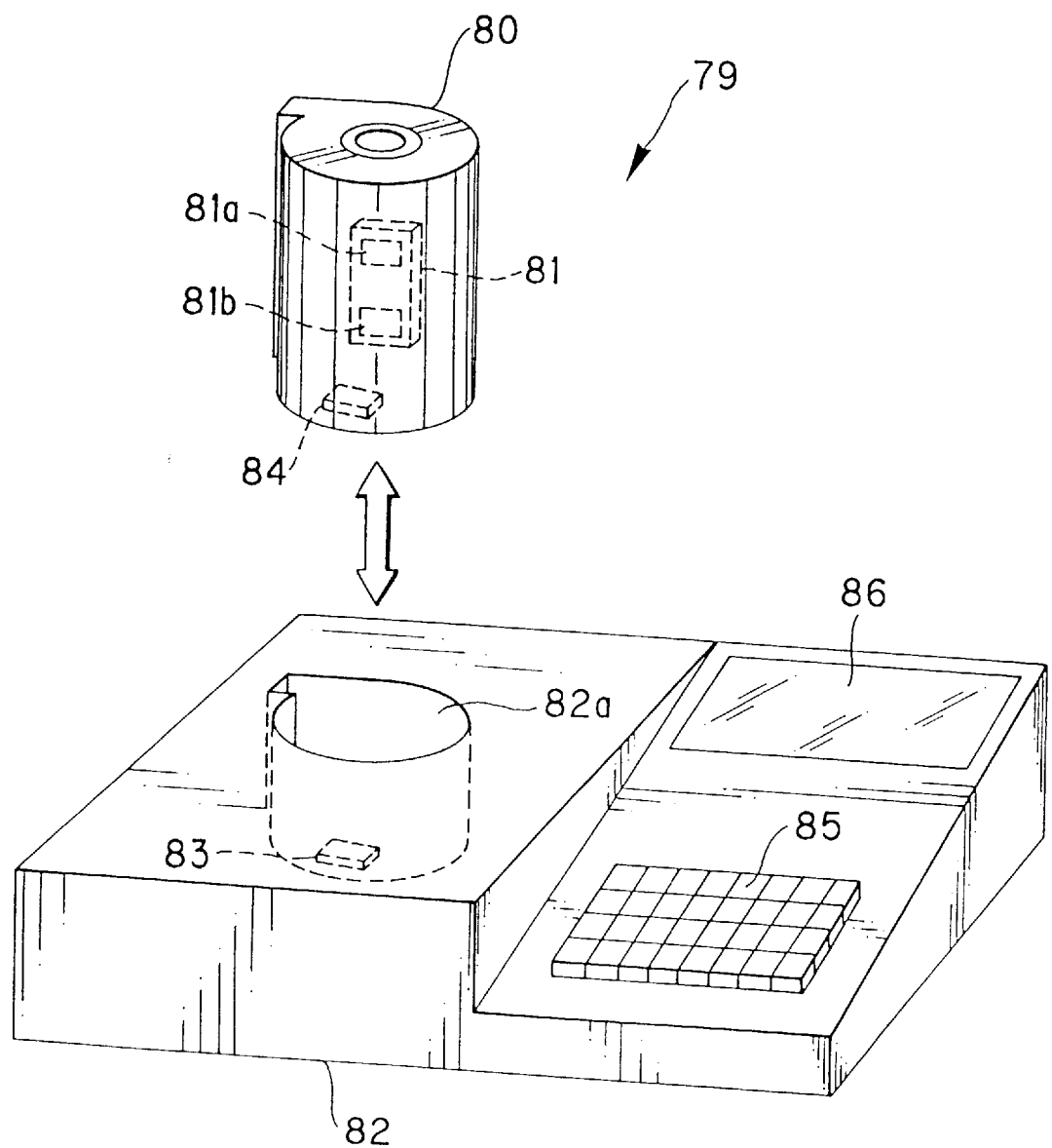
FIG. 20 is a perspective view of an external input/output device having a built-in EEPROM according to another preferred embodiment of the invention.

FIG. 20 shows an input/output device 79 according to another embodiment of the invention. The input/output device 79 is constituted of a separate plug-in unit 80 having the same shape as the cassette 5 and containing a chip 81 with an EEPROM 81a and a serial transfer device 81b, and a main body 82, for reading and writing the EEPROM 81a of the plug-in unit 80. The main body 82 has a recess 82a formed in an upper side thereof for accepting the separate plug-in unit 80. A reflective photo-sensor 83 is secured to the bottom of the recess 82a. When inserting the plug-in unit 80 in the recess 82, a reflective photo-sensor 84 mounted on the plug-in unit 80 is opposed to the photo-sensor 83.

Also the main body 82 has a built-in serial transfer device (not shown). The serial transfer devices of the plug-in unit 80 and the main body 82 may have the same construction as the above-described serial transfer device 43, so that the plug-in unit 80 and the main body 82 can exchange data with each other through the photo-sensors 83 and 84. When inputting data to the camera 1, first the plug-in unit 80 is put in the recess 82a, and the keyboard 85 is operated to display data or command to be inputted on a display screen 86 of the main body 82. After thus visually confirmed, the data is transferred to the EEPROM 81a of the plug-in unit 80 upon actuation of the execution key, through the photo-sensors 83 and 84.

Thereafter, the plug-in unit 80 is removed from the recess 82a, and is inserted in the cassette chamber 2 of the camera 1. The plug-in unit 80 detects that a spool drive shaft 2b starts rotating as soon as the bottom lid 2a is closed, and then begins to send the data stored in the EEPROM 81a. The data is thus written in the EEPROM 34 of the camera 34. Or, the plug-in unit may receive and write the content of the EEPROM 34 in the EEPROM 81a while inserted in the cassette chamber 2. The content of the EEPROM 81a may be transferred to the main body 82 while the plug-in unit 80 is inserted in the recess 82a.

Figure 21A:
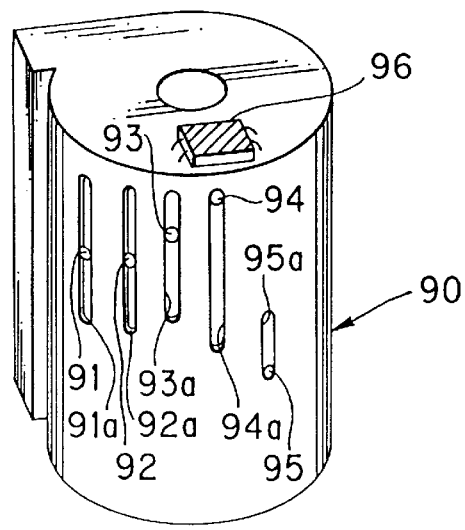
FIG. 21A is a perspective view of an external input device having various setting knobs and an EEPROM according to a further preferred embodiment of the invention.

FIG. 21A shows an input device 90 according to another embodiment of the invention. The input device 90 has the same shape as the film cassette 5. A plurality of setting knobs 91, 92, 93, 94 and 95 are provided on the periphery of the input device 90, and a photo-sensor 96 is disposed on one side of the input device 90. The input device 90 also has an EEPROM and a serial transfer device mounted therein, for data communication with the camera 1 through the photo-sensor 96.

Figure 21B:
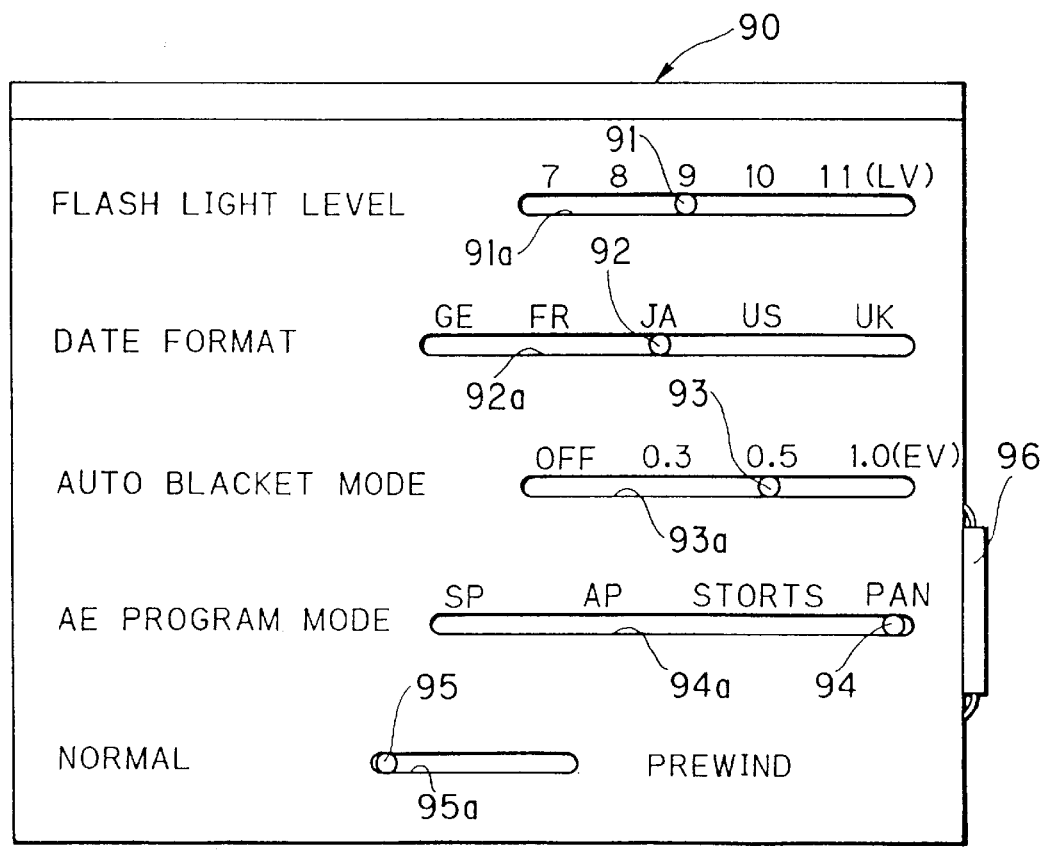
FIG. 21B is a detailed front view of the input device of FIG. 21A.

The input device 90 is also capable of entering various data such as control value data for the camera in its EEPROM by sliding the setting knobs 91 to 95 along slits 91a to 95a. Therefore, the input device 90 allows the photographer to set the camera 1 in appropriate operational modes for oneself. For example, as shown in FIG. 21B, the knob 91 is provided for setting a flash light level (LV). The knob 92 is for setting date/time information in the camera 1 by operating a built-in universal clock in accordance with the local time, e.g., the knob 92 is set in one of five positions corresponding to different countries: Germany (GE), France (FR), Japan (JP), U.S.A. U.S.) and United Kingdom (UK). The knob 93 is for setting the camera 1 in an auto-bracket mode wherein three frames are successively taken at different exposure values (EV) upon a depression of the shutter button 8. Moreover, the increment or decrement between the three different exposure values may be selected among three values: 0.3, 0.5 and 1.0.

The knob 94 is for selecting an automatic exposure (AE) program mode among four options: a shutter speed-priority AE mode "SP", an aperture-priority AE mode "AP", a high speed shutter AE mode "SPORT" which is suitable for photographing sports games, and a "PAN" AE mode for selecting an aperture value having a long depth of field, which is suitable for scenic-photography. The knob 95 is for selecting either a normal wind mode or a rewind mode. The normal wind mode is to withdraw the photographic film 7 one frame after each exposure from the cassette 5. The rewind mode is to previously withdraw the entire photographic film 7 from the cassette 5 prior to the photography, and rewind the film one frame after each exposure. The knobs 91 to 95 may be slidable in circumferential directions of the input device 90, or may be substituted by rotatable switches or button switches.

Although the plug-in unit 17 and 80, and the input device 90 have the same shape as the cassette 5 in the above embodiments, they may be smaller than the cassette 5 but their reflective photo-sensor must be arranged such that the light emitting element and the photoelectric element of the photo-sensor are opposed to the photoelectric element 6b and the light emitting element 6a of the photo-sensor 6 of the camera 1 in the cassette chamber 2.

It is possible to let the camera 1 get into the data I/O mode when the photoelectric element 6b detects light while the light emitting element 6a is inactive. The input/output device may not necessarily have the same reflective photo-sensor as the camera, but may have a separate light projecting member and a separate photoelectric member. It is also possible to provide an input/output device with a light projecting member or a photoelectric member alone, so as to use the input/output device either for writing or for reading the EEPROM of the camera.

Although the present invention has been described with respect to the preferred embodiments shown in the drawings, the present invention is not to be limited to the above-described embodiments, but on the contrary, various modifications are possible without departing from the scope of the appended claims.

What is claimed is:

1. A camera comprising:

a cassette chamber;

a data output operating mode;

a bar code sensor having a light projecting element and a photoelectric element which are disposed in said cassette chamber so as to read the bar codes from a bar code disc of a photographic film cassette; and a memory for storing control value data which is utilized in combination with data represented by said bar codes for executing a photographic sequence;

wherein optical signals are outputted through said light projecting element to an external output device in correspondence with said control value data stored in said memory when said camera is operating in said data output mode.

2. An input/output device for use with said camera as claimed in claim 1, comprising:

a photoelectric member which is insertable in said cassette chamber so as to be opposed to said light projecting element of said camera;

an operating section for entering commands for monitoring said control value data; and a monitor for displaying data in correspondence with optical signals received on said photoelectric member.

3. An input/output device as claimed in claim 2, wherein said photoelectric member is mounted on a plug-in portion which is insertable in said cassette chamber.

4. An input/output device as claimed in claim 3, wherein said plug-in portion has the same shape as said photographic film cassette.

5. In input/output device as claimed in claim 3, wherein said operating section includes a keyboard, and said plug-in portion is connected through a cord to said operating section.

6. A camera comprising:

a cassette chamber;

a data input/output operating mode;

a bar code sensor having a light projecting element and a photoelectric element which are disposed in said cassette chamber so as to read the bar codes from a bar code disc of a photographic film cassette; and a memory for storing control value data which is utilized in combination with data represented by said bar codes for executing a photographic sequence;

wherein optical signals are outputted through said light projecting element to an external output device in correspondence with said control value data stored in said memory, and said memory is capable of being rewritten in accordance with optical signals inputted through said photoelectric element when said camera is operating in said data input/output mode.

7. A camera as claimed in claim 6, further comprising a serial transfer device for temporarily storing data to output and driving said light projecting element to project light pulses corresponding to said output data, and for converting received optical signals into binary code data and temporarily storing said binary code data before writing in said memory, said serial transfer device comprising first to third flag memories for indicating whether said camera is in said data input/output mode, whether there is data to output, and whether there is a binary code data to write, respectively.

8. A camera as claimed in claim 7, wherein, when said camera is not in said data input/output mode, said second flag memory is used for controlling said light projecting element ON and OFF, and said third flag memory is used for serially reading each bit of said bar codes.

9. An input/output device for use with said camera as claimed in claim 6, comprising:

a light projecting member which is insertable in said cassette chamber so as to be opposed to said photoelectric element of said camera;

a photoelectric member which is insertable in said cassette chamber so as to be opposed to said light projecting element of said camera;

an operating section for entering commands and data to be written in said memory of said camera;

a control section for driving said light projecting member to output optical signal in correspondence with said commands and said data entered through said operating section; and a monitor for displaying data in correspondence with optical signals received on said photoelectric member.

10. An input/output device as claimed in claim 9, wherein said light projecting member and said photoelectric member are mounted on a plug-in portion which is insertable in said cassette chamber.

11. An input/output device as claimed in claim 10, wherein said plug-in portion has the same shape as said photographic film cassette.

12. An input/output device as claimed in claim 10, wherein said operating section includes a keyboard, and said plug-in portion is connected through a cord to said operating section.

13. An input/output device as claimed in claim 10, wherein said plug-in portion constitutes a separate body from a main body having said operating section, said separate body containing a second memory readable and writable through said light projecting member and said photoelectric member, whereas said main body having a second light projecting member and a second photoelectric member which may be respectively opposed to said photoelectric member and said light projecting member of said separate body for writing and reading said second memory.

14. An input/out device as claimed in claim 13, wherein said input/output device starts communicating data with said camera when a spool drive shaft for rotating a spool of said photographic film cassette starts rotating when a lid of said cassette chamber is closed after said plug-in portion is inserted in said cassette chamber.

15. An input/output device as claimed in claim 10, wherein a monitor code may be entered through said operating section so as to monitor control value data used for executing an individual process independently of other processes included in said photographic sequence.

16. A camera comprising:
  a bar code sensor having a light projecting element and a photoelectric element which are disposed in a cassette chamber so as to project light toward a bar code disc of a photographic film cassette and receive light reflected from said bar code disc to read a bar code signal from said bar code disc;
  a signal processing circuit connected to said photoelectric element, for processing said bar code signal in a first mode and for processing in a second mode a control signal which is sent from an external device in a form of an optical signal directly to said photoelectric element;
  mode switching means for switch-over between said first and second mode; and
  circuit switching means for switching said signal processing circuit between said first and second modes, in response to said mode switching means;
  wherein said bar code signal and said control signal have different characteristics.

17. A camera as claimed in claim 16, wherein said circuit switching means changes an amplification factor for said bar code signal from that for said control signal.

18. A camera as claimed in claim 16, wherein said circuit switching means changes a response speed for said bar code signal from that for said control signal.

19. A camera as claimed in claim 16, wherein said photoelectric element includes a photo-transistor, and said circuit switching means changes an impedance of said signal processing circuit, which is connected to an emitter or collector of said photo-transistor, for said bar code signal from that for said control signal.

20. A camera as claimed in claim 16, wherein said circuit switching means is integral with said mode switching means.

21. A camera as claimed in claim 16, wherein said circuit switching means comprises a switch which is actuated by a lid movable for opening and closing said cassette chamber.

22. A camera as claimed in claim 20 wherein said circuit switching means comprises an externally operable switch which is connected in said signal processing circuit.

23. A camera as claimed in claim 21 wherein said circuit switching means comprises an externally operable switch which is connected in said signal processing circuit.

* * * * *